(12) United States Patent
Nishikori et al.

(10) Patent No.: US 7,284,823 B2
(45) Date of Patent: Oct. 23, 2007

(54) PRINT APPARATUS AND PRINTING METHOD

(75) Inventors: Hitoshi Nishikori, Tokyo (JP); Hiroshi Tajika, Yokohama (JP); Daisaku Ide, Tokyo (JP); Takeshi Yazawa, Yokohama (JP); Atsuhiko Masuyama, Tokyo (JP); Satoshi Seki, Kawasaki (JP); Akiko Maru, Kawasaki (JP); Hirokazu Yoshikawa, Kawasaki (JP); Hideaki Takamiya, Kawasaki (JP); Kosuke Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 11/203,203

(22) Filed: Aug. 15, 2005

(65) Prior Publication Data

US 2006/0044333 A1  Mar. 2, 2006

(30) Foreign Application Priority Data

Aug. 30, 2004 (JP) .............................. 2004-251079

(51) Int. Cl.
*B41J 2/15* (2006.01)

(52) U.S. Cl. .............................. 347/40; 347/9; 347/12; 347/15

(58) Field of Classification Search .................... 347/5, 347/6, 9, 12, 40, 41
See application file for complete search history.

(56) References Cited

U.S. PATENT DOCUMENTS

| 6,155,668 | A | 12/2000 | Otsuki et al. | ................. 347/41 |
|---|---|---|---|---|
| 6,310,640 | B1 * | 10/2001 | Askeland | .................... 347/41 |
| 6,312,099 | B1 * | 11/2001 | Hawkins et al. | .............. 347/42 |
| 6,416,151 | B1 | 7/2002 | Otsuka et al. | ................ 347/19 |
| 6,527,364 | B2 | 3/2003 | Takahashi et al. | ............ 347/40 |
| 6,532,026 | B2 | 3/2003 | Takahashi et al. | ............ 347/41 |
| 6,557,964 | B2 | 5/2003 | Kawatoko et al. | ............ 347/15 |
| 6,565,192 | B1 * | 5/2003 | Vinals et al. | ................. 347/41 |
| 6,601,939 | B2 | 8/2003 | Fujita et al. | .................. 347/15 |
| 6,779,873 | B2 * | 8/2004 | Maeda et al. | ................. 347/43 |
| 6,832,825 | B1 | 12/2004 | Nishikori et al. | ............. 347/19 |
| 6,874,864 | B1 * | 4/2005 | Maeda et al. | ................. 347/41 |
| 6,908,168 | B2 * | 6/2005 | Kawaguchi | .................. 347/12 |
| 6,963,423 | B2 | 11/2005 | Ogasahara et al. | .......... 358/1.8 |
| 6,994,413 | B2 | 2/2006 | Otsuka et al. | ................ 347/19 |
| 7,011,383 | B2 * | 3/2006 | Edwards et al. | .............. 347/16 |
| 2002/0024556 | A1 * | 2/2002 | Otsuki | .......................... 347/41 |
| 2002/0024558 | A1 * | 2/2002 | Fujita et al. | .................. 347/43 |

(Continued)

FOREIGN PATENT DOCUMENTS

JP           6-330616        11/1994

(Continued)

*Primary Examiner*—Matthew Luu
*Assistant Examiner*—Joshua M Dubnow
(74) *Attorney, Agent, or Firm*—Fitzpatrick, Cella, Harper & Scinto

(57) ABSTRACT

The present invention provides a print apparatus and a printing method which enable high-grade images to be output at high speed without the need to drastically reduce the number of printing elements used to print leading and trailing end portions of a print medium. A first mask pattern used to print a middle portion of the print medium is different from a second mask pattern used to print the leading or trailing end portion of the print medium. The present invention thus eliminates the need to drastically reduce the number of printing elements used to print the leading or trailing end portion as with the prior art.

7 Claims, 32 Drawing Sheets

U.S. PATENT DOCUMENTS

| | | | |
|---|---|---|---|
| 2002/0054305 A1* | 5/2002 | Ogasahara et al. | 358/1.8 |
| 2002/0109752 A1* | 8/2002 | Sato | 347/43 |
| 2002/0167565 A1* | 11/2002 | Maeda et al. | 347/40 |
| 2003/0103101 A1* | 6/2003 | Otsuki | 347/41 |
| 2004/0212658 A1* | 10/2004 | Otsuki | 347/41 |
| 2005/0122377 A1* | 6/2005 | Mizutani et al. | 347/41 |
| 2005/0168507 A1 | 8/2005 | Ide et al. | 347/12 |
| 2006/0038850 A1 | 2/2006 | Teshigawara et al. | 347/43 |

FOREIGN PATENT DOCUMENTS

| | | |
|---|---|---|
| JP | 11-291506 | 10/1999 |
| JP | 2002-96455 | 4/2002 |
| JP | 2002-144522 | 5/2002 |
| JP | 2002-144637 | 5/2002 |
| JP | 2004-98668 | 4/2004 |

* cited by examiner

| EXPERIMENTAL CONDITIONS | a | b | c | d | e |
|---|---|---|---|---|---|
| END PRINTING RATE RATIO | 0.6 | 0.5 | 0.4 | 0.3 | 0.2 |
| END | 15 | 12.5 | 10 | 7.5 | 5 |
| MIDDLE PORTION | 35 | 37.5 | 40 | 42.5 | 45 |

FIG.8

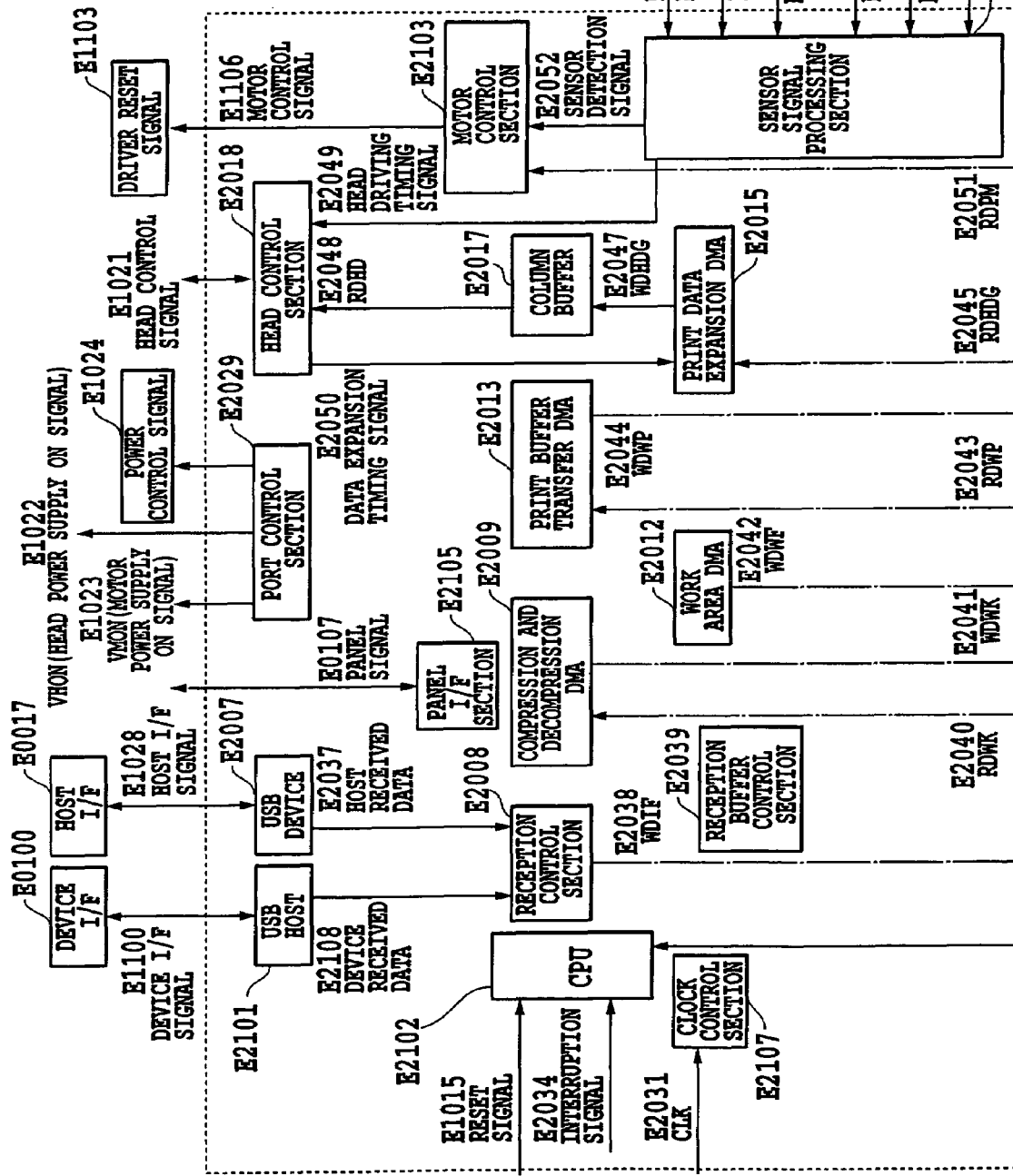

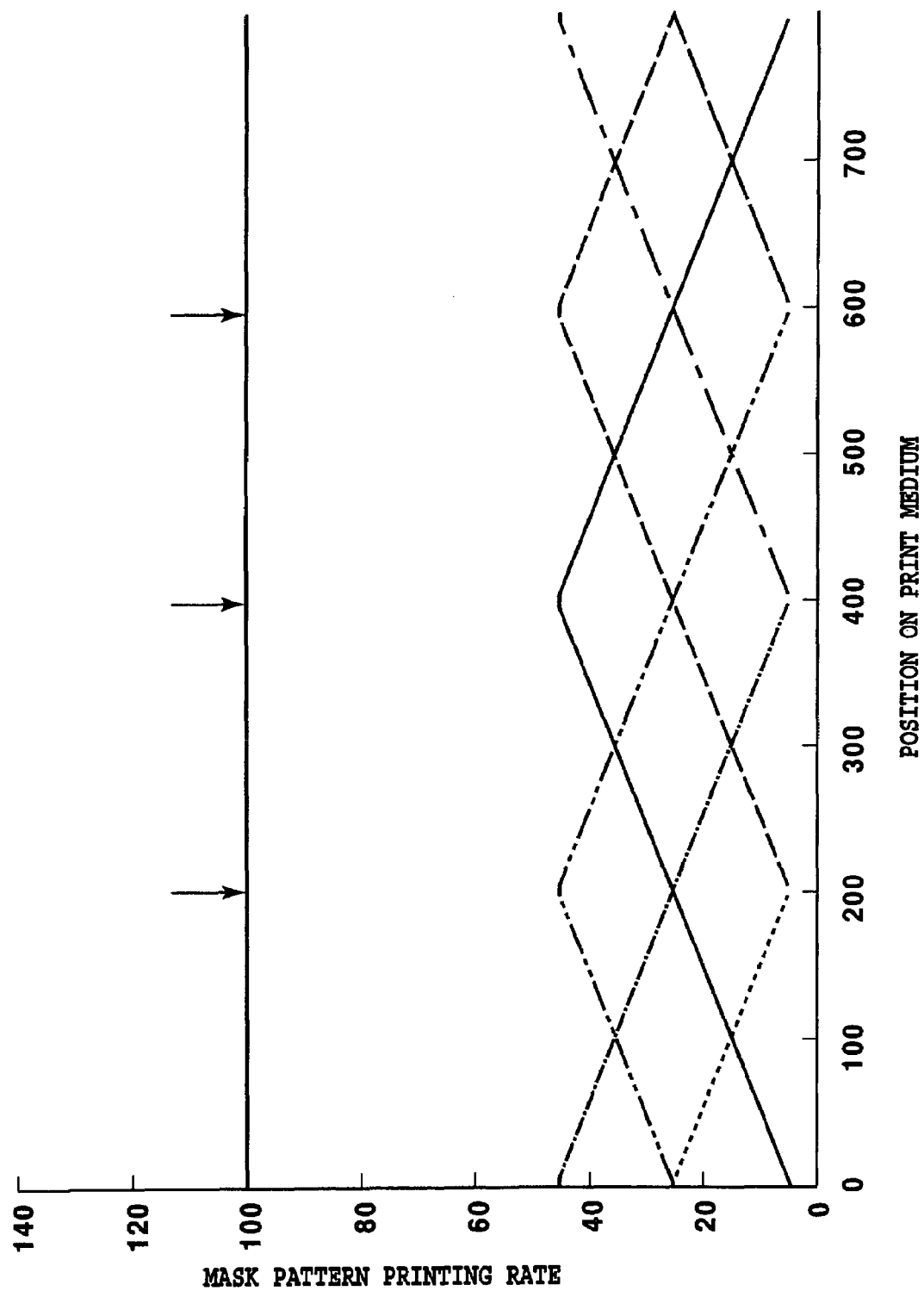

PRINT APPARATUS AND PRINTING METHOD

BACKGROUND OF THE INVENTION

1. Field of the Invention

The present invention relates to a print apparatus that forms an image by printing a print agent on a print medium.

2. Description of the Related Art

OA equipment such as personal computers and word processors has recently been prevailing widely. Accordingly, various print apparatuses have been provided which print information output by these pieces of equipment on a variety of print media. In particular, print apparatuses based on an ink jet system have various advantages such as low noise, low running costs, small sizes, and the ease of introduction of colors. These print apparatuses are thus accepted by a wide variety of users. There has recently been a growing demand for improvement of images picked up using digital cameras; the grade of output images is desirably similar to that of silver salt photographs. In response to this, improved printing methods are now carried out. For example, owing to the configuration of print apparatuses, the accuracy with which print media are conveyed tends to decrease at the leading or trailing end portion of the print media. Thus, ink jet print apparatuses have already been provided which employ a special printing method for the leading or trailing end portion of print media. Further, print apparatuses are now common which adopt a printing method called "multipass printing" in order to output smoother images having a quality equivalent to that of photographs. A brief description will be given of the specific configurations of the "leading and trailing end portion printing" and "multi-pass printing".

(Method for Printing Leading and Trailing End Portions)

When the leading or trailing end portion of a print medium is printed, the print medium may depart from part of a plurality of rollers that convey the print medium while supporting it in its front and rear. As a result, the image may be disturbed. This will be described below in detail.

FIG. 1 schematically shows a print head, a print medium, and a conveying mechanism that conveys the print medium while supporting it. The figure shows that the middle portion of the print medium is being printed. In the figure, three nip portions are formed by a conveying roller M3060, two sheet discharging rollers M3100 and M3110, and spurs M3070 and M3120 located opposite these rollers. The rollers and spurs spread and support the print medium. Rotation of the three rollers enables the print medium P to be conveyed in a direction shown by the arrow in the figure.

Reference numeral H1000 denotes a head cartridge. The head cartridge has a plurality of printing elements arranged at a predetermined pitch in the conveying direction in the figure to eject ink. The head cartridge H1000 causes the printing elements to eject ink while moving and scanning in a direction in which the head cartridge moves away from the reader. The head cartridge thus forms an image in an area of the print medium P located between the conveying roller M3060 and the auxiliary roller M3100. Images are sequentially formed on the print medium P by alternately repeating a printing scan by the head cartridge H1000 and an operation performed by the roller pair to convey the print medium.

FIG. 2 shows that printing progressed compared to the state shown in FIG. 1 and that the vicinity of the trailing end portion of the print medium P is being printed. The print medium P has already departed from the conveying roller M3060. The print medium is being conveyed only by rotation of the sheet discharging rollers M3100 and M3110.

In general, the conveying roller M3060 and the sheet discharging rollers M3100 and M3110 often have slightly different roller diameters and conveyance accuracies owing to their major roles. The major role of the conveying roller M3060 is to position the print medium at an appropriate position for the print head for each printing scan. Thus, the conveying roller M3060 has a sufficient roller diameter and can perform a conveying operation with a desired accuracy. In contrast, the major roll of the sheet discharging rollers M3100 and M3110 is to reliably discharge the printed print medium. The sheet discharging rollers M3100 and M3110 often have smaller roller diameters and a lower print media conveying accuracy than the conveying roller M3060. That is, the conveying accuracy may decrease in an area corresponding to the period after the trailing end portion of the print medium P departs from the conveying roller M3060 and before the trailing end portion of the print medium P is completely printed, compared to the preceding area. In this case, depending on a printed image, black stripes may be observed if conveyance amount is insufficient or white stripes may be observed if the conveyance amount is too large. This may adversely affect the image.

Moreover, the image is also adversely affected by the lack of retention of the opposite ends of the print medium. When the trailing end portion of the print medium P departs from the conveying roller M3060, the distance between the print head and print medium (this distance will be referred to as a head-medium distance below) varies greatly and subsequently becomes unstable. An inkjet print head moves and scans while ejecting ink at a time corresponding to a predetermined head-medium distance maintained by the front and rear rollers. Ink ejected at an appropriate time forms dots on the print medium. The dots are arranged at an appropriate pitch to form an image. Accordingly, if the head-medium distance is changed during printing or subsequently varies significantly, the positions of dots on the print medium become unstable. As a result, a defect may occur such as white or black stripes or the sense of roughness. This head-medium distance problem occurs not only at the trailing end portion but also the leading end portion of the print medium during printing.

FIG. 3 shows that the vicinity of the leading end portion of the print medium P is being printed. The print medium P is being held and conveyed only by the conveying roller 3060. For printing of the leading end portion, the print medium P is not conveyed by the sheet discharging rollers M3100 and M3110 but by the conveying roller M3060. Accordingly, the conveyance is carried out more precisely than in the case in which the vicinity of the trailing end portion is printed as described in FIG. 2. However, the head-medium distance problem, caused by the lack of retention of the leading end portion of the print medium P, also occurs in this case as shown in FIG. 2. That is, the accuracy of dot positions on the print medium is more unstable than that in the printing of middle portion of the print medium.

To deal with the image problem associated with the leading and trailing end portions of the print medium, serial ink jet print apparatuses, which attach great importance particularly to image grade, commonly adopt the following method. The printing width (that is, the number of printing elements that actually eject ink) of the print head is reduced only at the leading and trailing end portions to correspondingly decrease the amount of print medium conveyed (see, for example, Japanese Patent Application Laid-Open No. 2004-98668). The reduction in the printing width of the print head makes it possible to suppress a variation in head-medium distance with respect to the printing width. This is effective particularly on the sense of roughness, which may occur when multi-pass printing is carried out as described later. Further, even with a decrease in conveyance accuracy, the resulting conveyance error can be reduced by lessening the print medium conveyance amount. Moreover, the pitch decreases in the intervals between print areas to make white or black stripes unmarked.

Ink jet print apparatuses employing an interlace printing method also adopt the method of reducing the number of printing elements actually ejecting ink, only at the trailing end portion to correspondingly decrease the print medium conveyance amount; these ink jet print apparatuses use a print head in which printing elements have an arrangement density lower than a recording density to complete an image while interpolating printing density in the sub-scanning direction of printing scan (see, for example, Japanese Patent Application Laid-Open No. 11-291506 (1999)).

(Multi-pass Printing Method)

The multi-pass printing method will be described below in brief.

FIG. 4 schematically shows a print head and a print pattern. Reference numeral P0001 denotes a print head. In this case, the print head is assumed to have 16 printing elements for simplification. As shown in the figure, the printing elements are divided into four printing element groups, a first to fourth groups. Each printing element group includes four printing elements. Reference numeral P0002 denotes a mask pattern, areas printed by the printing elements are painted with black. The patterns printed by the respective printing element groups are complementary to one another. Superimposing these patterns completes printing the 4×4 area.

The patterns shown by P0003 to P0006, show how the image is completed by repeating printing scans. Every time a printing scan is finished, the print medium is conveyed by a distance corresponding to the width of each printing element group in the direction of the arrow in the figure. Thus, the image in the same area (corresponding to the width of each printing element group) in the print medium is completed by four printing scans.

As described above, each area of the print medium is formed by using the plurality of printing element groups to execute a plurality of scans. This is effective on reducing a variation intrinsic to the printing elements, a variation in print medium conveyance accuracy, or the like. Further, modifying the arrangement of the mask patterns also makes it possible to deal with various other image problems, the reliability of the print apparatus.

For example, with the recent ink jet print head ejecting a large number of small droplets at a high frequency, the direction in which ink is ejected from the printing elements located at an end of the print head may be skewed inwardly. In this case, dots formed by the printing elements located at the end of the printing element row impact a position inward of the regular one. As a result, white stripes (referred to as an end-deviation below) appear at a pitch equal to the printing width of the print head. Even in this situation, the modification of the arrangement of the mask patterns can make the end-deviation unmarked (see, for example, Japanese Patent Application Laid-Open No. 2002-096455).

FIG. 5 is a diagram showing an example of mask patterns employed to make the end-deviation unmarked. The black areas in the mask patterns in FIG. 5 play the same role as that of the black areas in the mask patterns in FIG. 4. The black areas permit printing. The white areas in the mask patterns in FIG. 5 play the same role as that of the white areas in the mask patterns in FIG. 4. The white areas do not permit printing. In this example, a print head having 768 printing elements is used to carry out 4-pass printing. As in the case of FIG. 4, the 768 printing elements are divided into four printing element groups. In this case, printing rate (the percentage for which the number of black areas accounts in the total number of black and white areas constituting the mask patterns) varies depending on the positions of the printing elements. The printing rate of the mask pattern corresponding to the first printing element group is N. The printing rate of the mask pattern corresponding to the second printing element group is M (M>N). The printing rate of the mask pattern corresponding to the third printing element group is M. The printing rate of the mask pattern corresponding to the fourth printing element group is N. The sum (N+M+M+N) of the printing rates of the mask patterns corresponding to the four printing element groups is 100%. In this manner, the printing rate of the printing elements in the middle portion is set at a relatively large value but decreases gradually toward the end of the row of the printing elements. The above inward skewing of the ejecting direction has been found to be significant as smaller ink droplets are printed more densely and faster. Accordingly, setting the printing rate of the end of the row of the printing elements lower than that of the middle portion, it is possible to weaken the tendency to inwardly skew of the printing elements located at the end. Further, even with the presence of this tendency, an end-deviation resulting from deviations in printing positions is made insignificant because of a decrease in the number of dots ejected from the printing elements located at the end.

For ink jet print apparatuses focusing on photographic image quality, important elements are a decrease in the volume of each droplet, an increase in the density of printing elements, and an increase in driving frequency. Thus, such mask patterns as shown in FIG. 5 are generally useful for the recent ink jet print apparatuses attaching great importance to photographic image quality.

As already described, print apparatuses focusing particularly on image quality reduce the number of printing elements to use at the leading and trailing end portions. Thus, to simultaneously carry out such leading and trailing end portion printing and multi-pass printing, the mask patterns for the multi-pas printing must be switched at the leading and trailing end portions of the print medium. Such a configuration is already disclosed in Japanese Patent Application Laid-Open No. 2002-144637.

In many cases, measures for suppressing the adverse effect of the end-deviation are often required for the leading and trailing end portions at which printing is carried out with a reduced number of printing elements. Accordingly, even in the mask pattern applied to the leading or trailing end portion, the printing rate of the terminal of this end is commonly equivalent to that of the terminal at printing for the middle portion of the print medium regardless of the number of printing elements used for printing.

However, with the conventional printing method, the number of printing elements used to print the leading or trailing end portion is sharply reduced compared to that of printing elements used to print the middle portion. This disadvantageously increases the time required to print the leading and trailing end portions. That is, even if the print apparatus which has a large number of printing elements and is capable of printing at high speed, the printing speed is lower when the leading or trailing end portion is printed. As a result, the print apparatus cannot fully exhibit its high speed performance. Under these circumstances, the inventors concentrated their energy on examinations to find that the adverse effect on an image at its leading and trailing end portions can be suppressed to some degree by modifying applied mask patterns. The inventors thus believe that by applying such mask patterns to the areas of the leading and trailing end portions, it is possible to output images at almost the same level as that achieved with the conventional technique, at a speed higher than that achieved with the conventional technique, without the need to reduce the number of printing elements used for printing down to the conventional level.

SUMMARY OF THE INVENTION

An object of the present invention is to provide a print apparatus and a printing method which make it possible to output images at almost the same grade as that achieved with the conventional technique, at a speed higher than that achieved with the conventional technique, by finding mask patterns that can suppress defects intrinsic to the leading and trailing end portions without reducing the number of printing element used for printing down to the conventional level.

A first aspect of the present invention is a print apparatus that forms an image by repeating a printing scan that carries out printing on a print medium in accordance with image data while scanning a print head having a plurality of printing elements arranged in a predetermined direction, in a direction different from the predetermined direction, and a sub-scan that conveys the print medium in a direction crossing the scan direction, the apparatus comprising: a storage section that stores a first mask pattern used to distribute image data corresponding to a middle portion of the print medium, to a plurality of printing scans, and a second mask pattern used to distribute image data corresponding to at least one of the leading and trailing end portions of the print medium, to a plurality of the printing scans; first printing control means for printing the middle portion of the print medium on the basis of the first mask pattern read from the storage section and image data; and second printing control means for printing the end portion of the print medium on the basis of the second mask pattern read from the storage section and image data, wherein printing rates of the first and second mask patterns are specified so that a printing rate of an end printing element of the printing elements used for the printing by the second printing control means is lower than that of an end printing element of the printing elements used for the printing by the first printing control means.

A second aspect of the present invention is a printing method of forming an image by repeating a printing scan that carries out printing on a print medium in accordance with image data while scanning a print head having a plurality of printing elements arranged in a predetermined direction, in a direction different from the predetermined direction, and a sub-scan that conveys the print medium in a direction crossing the scan direction, the method comprising: a first distributing step of using a first mask pattern to distribute image data corresponding to a middle portion of the print medium, to a plurality of printing scans; a first printing step of executing the plurality of printing scans to print the same scan area in the middle portion of the print medium, on the basis of the image data distributed in the first distributing step; a second distributing step of using a second mask pattern to distribute image data corresponding to at least one of the leading end portion or trailing end portion of the print medium, to a plurality of printing scans; and a second printing step of executing the plurality of printing scans to print the same scan area in the end portion of the print medium, on the basis of the image data distributed in the second distributing step, and wherein a printing rate of the second mask pattern corresponding to an end printing element of the printing elements used in the second printing step is lower than that for the first mask pattern corresponding to an end printing element of the printing elements used in the first printing step.

The above and other objects, effects, features and advantages of the present invention will become more apparent from the following description of embodiments thereof taken in conjunction with the accompanying drawings.

BRIEF DESCRIPTION OF THE DRAWINGS

FIG. 8 is a table showing the printing rates of ends and middle portions of the mask patterns and the end duty ratios of the mask patterns;

FIGS. 9A and 9B are diagrams showing an example of the mask pattern shown by a;

FIG. 19 is a diagram showing the relationship of FIGS. 19A and 19B;

FIG. 19A is a block diagram showing the internal configuration of an ASIC;

FIGS. 26A to 26C are diagrams illustrating the adverse effect of end printing rate ratio on an image grade.

DETAILED DESCRIPTION OF PREFERRED EMBODIMENTS

A first embodiment of the present invention will be described below in detail. First, description will be given of the configuration of main body of an ink jet print apparatus used in the present embodiment.

(Configuration of Mechanism Section)

The print apparatus main body according to the present embodiment can be classified into a sheet feeding section, a sheet conveying section, a sheet discharging section, a carriage section, a cleaning section, and a exterior section in terms of the role of each mechanism. These items will be described below in brief.

(A) Sheet Feeding Section

Figure 12:
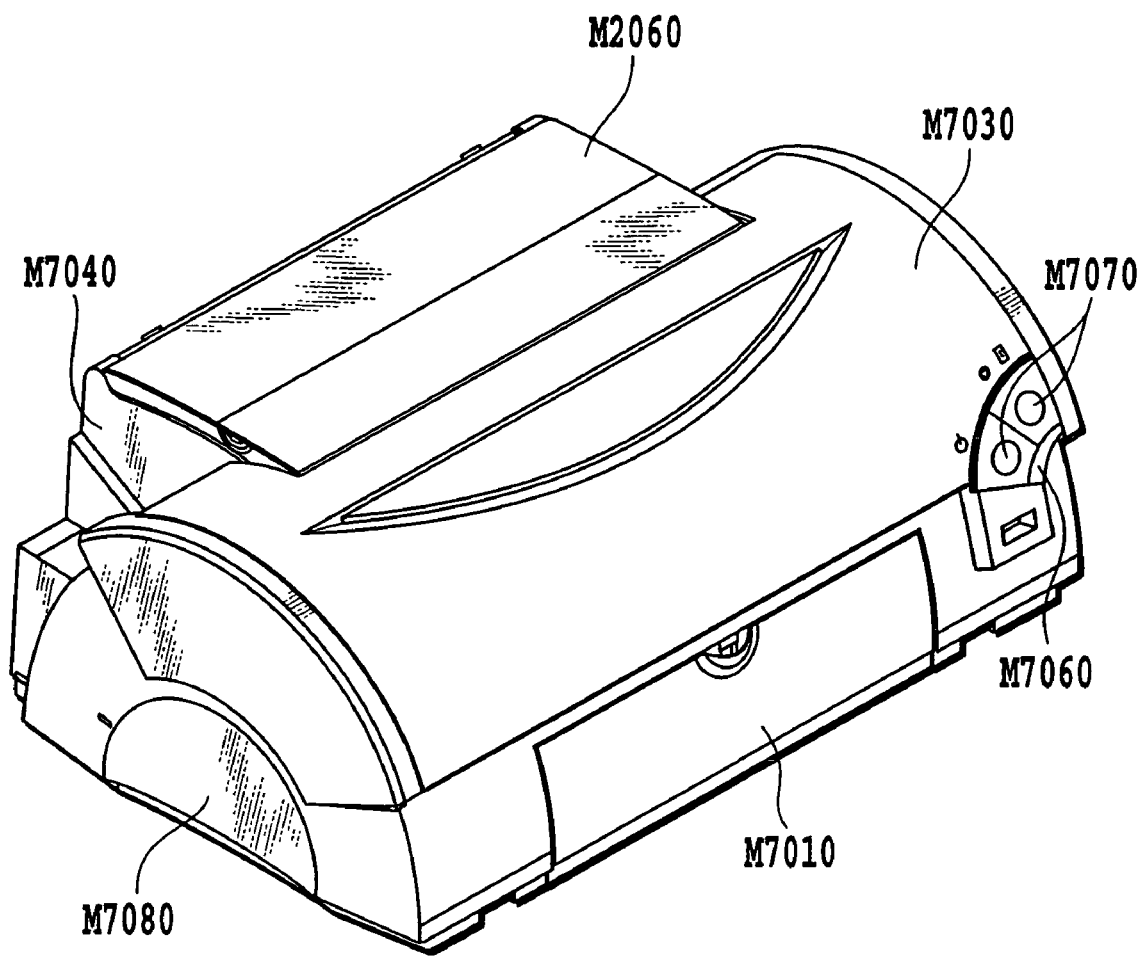
FIG. 12 is a perspective view of a print apparatus according to an embodiment of the present invention.
Figure 13:
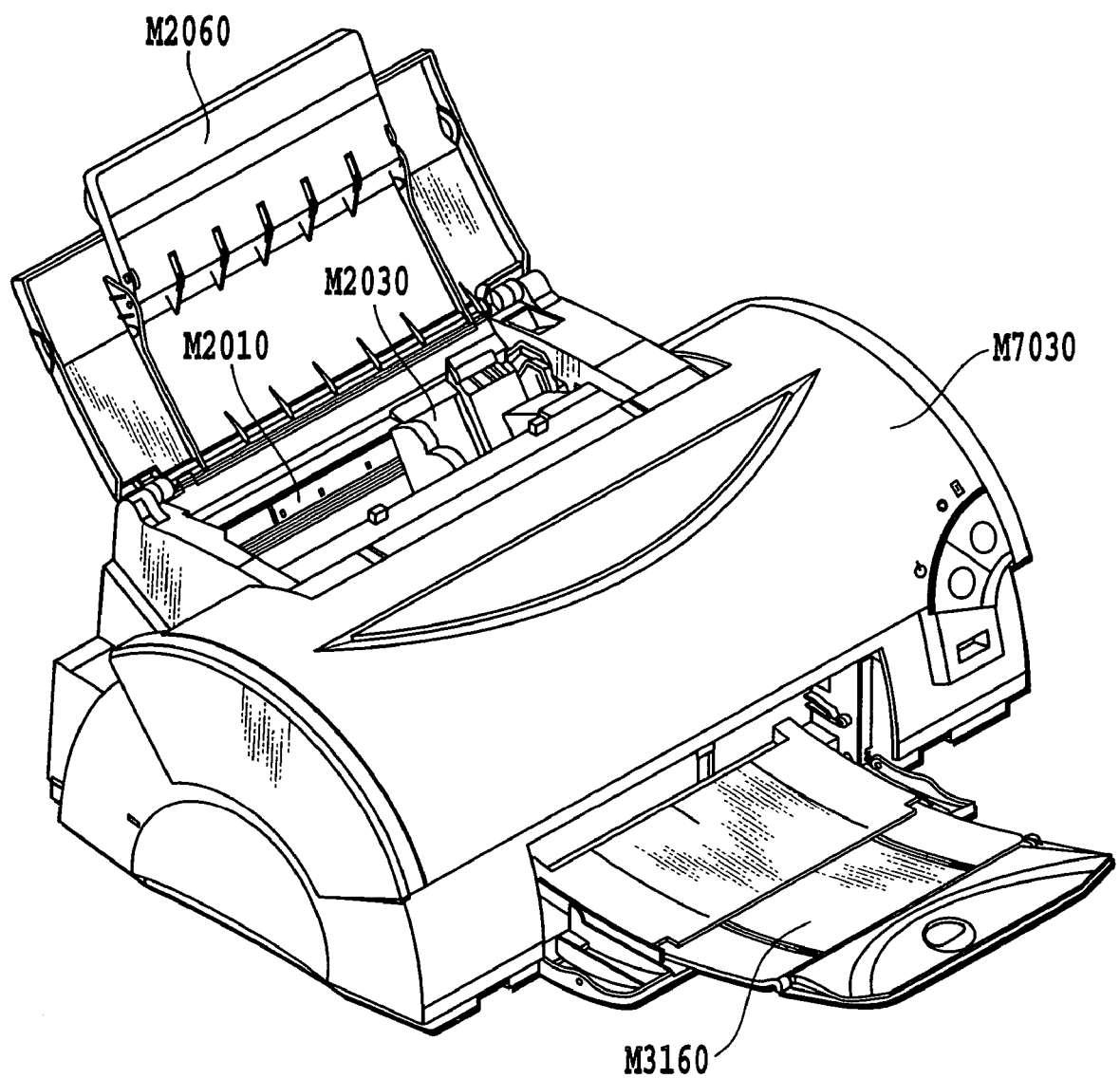
FIG. 13 is a perspective view of the print apparatus according to the embodiment of the present invention.
Figure 14:
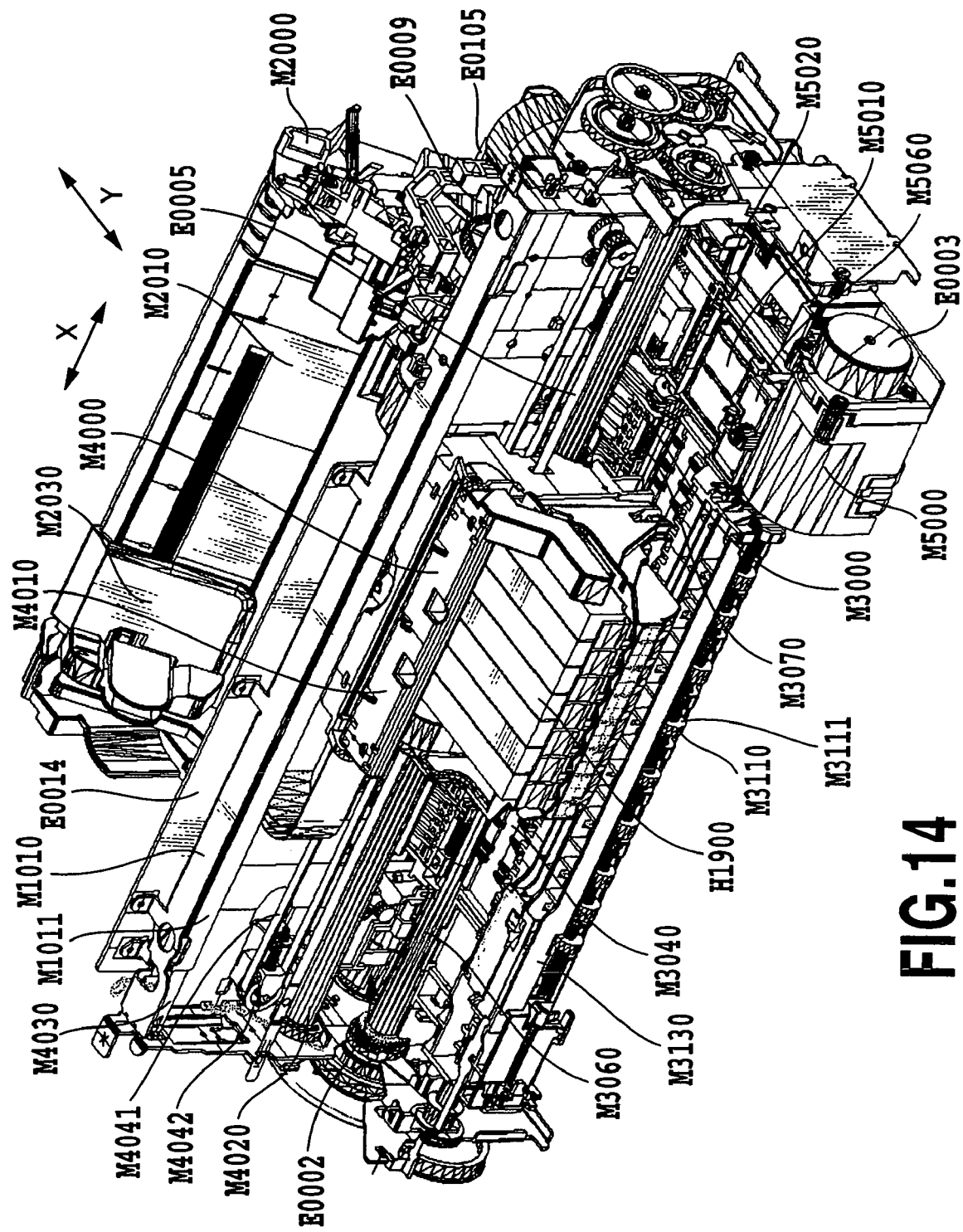
FIG. 14 is a perspective view of a mechanism section of the print apparatus according to the embodiment of the present invention.
Figure 15:
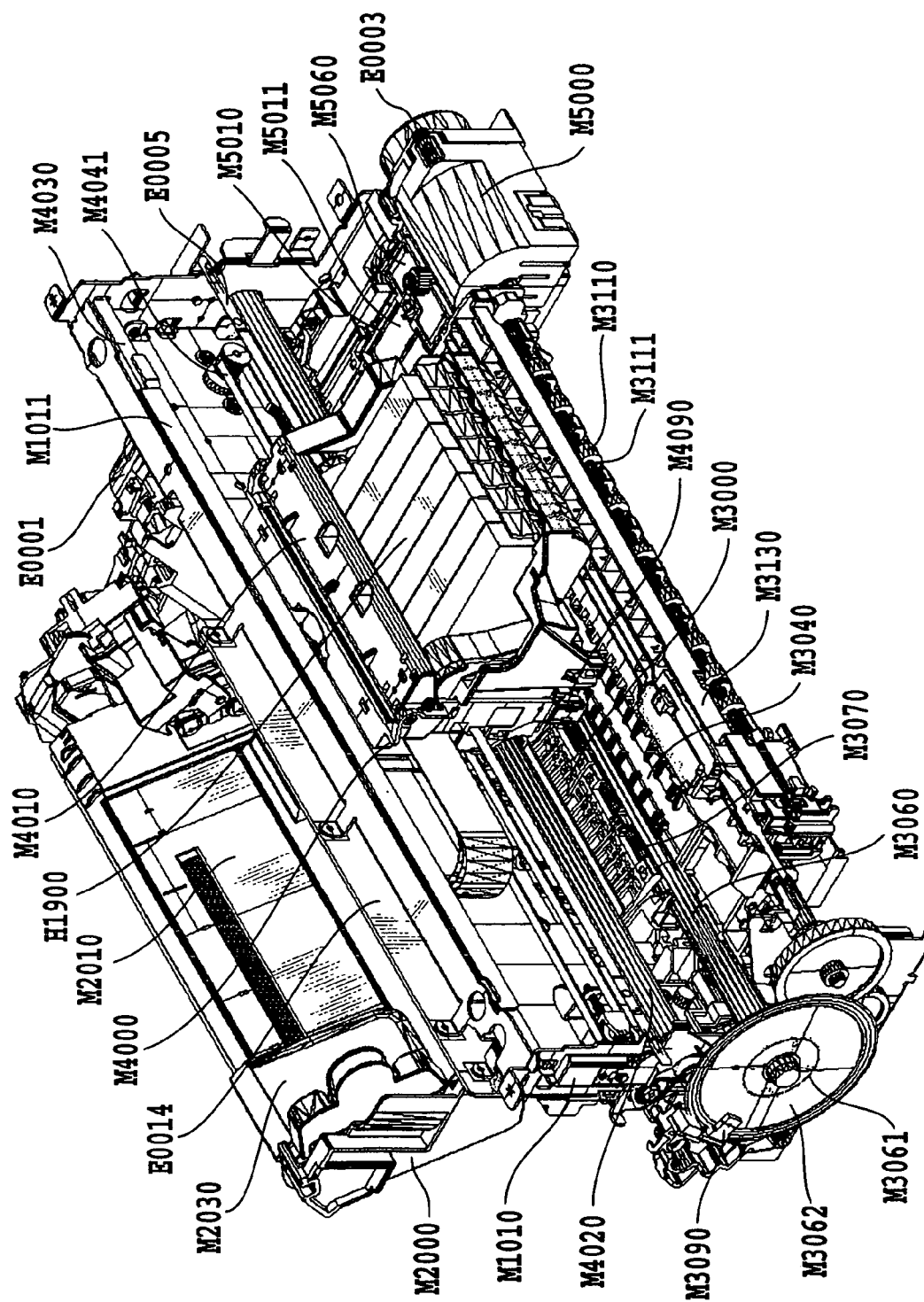
FIG. 15 is a perspective view of the mechanism section of the print apparatus according to the embodiment of the present invention.
Figure 16:
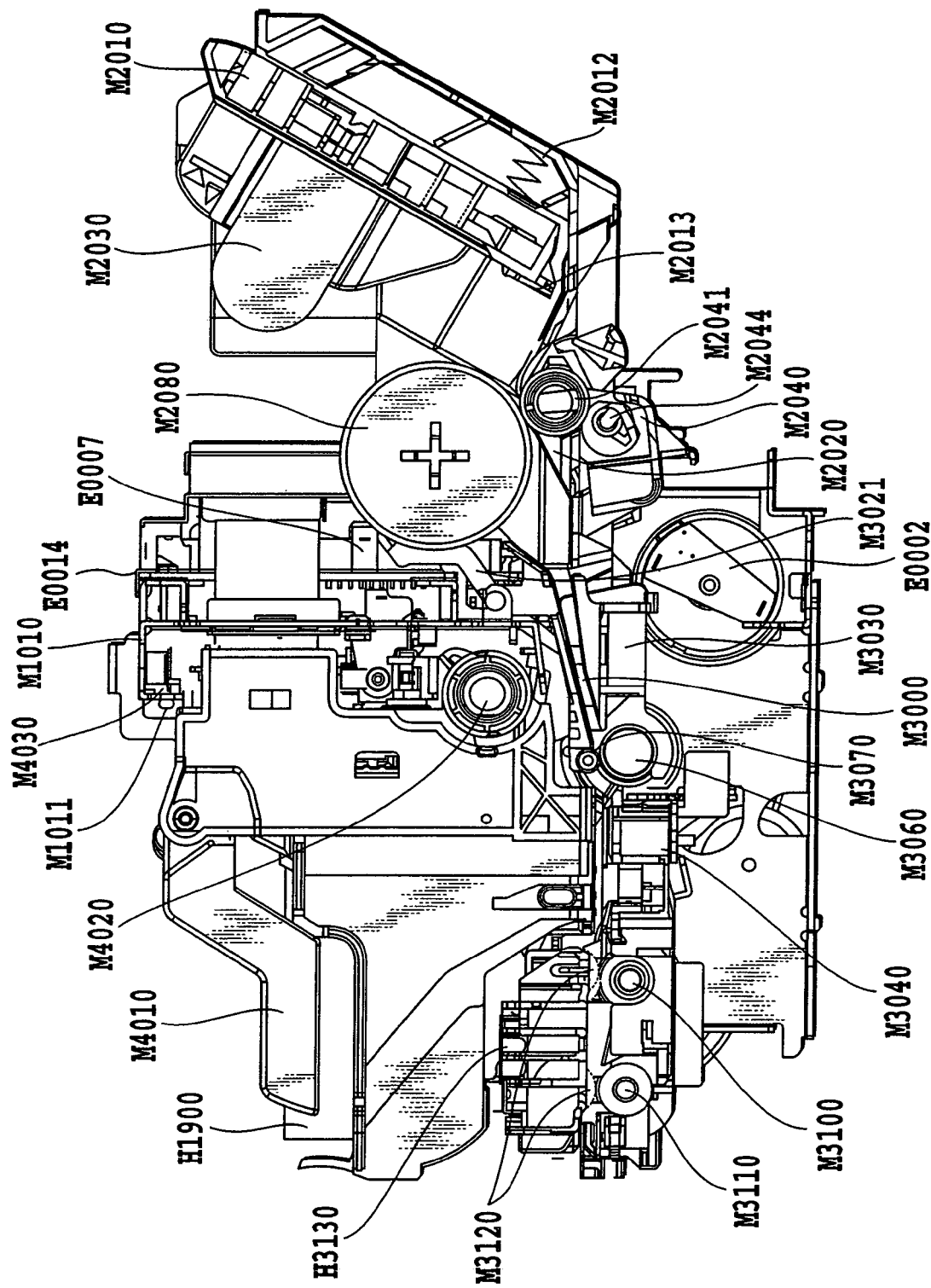
FIG. 16 is a sectional view of the print apparatus according to the embodiment of the present invention.

FIGS. 12 and 13 are perspective views of the print apparatus used in the present embodiment. FIG. 12 shows that the print apparatus is out of operation. FIG. 13 shows that the print apparatus is in operation. FIGS. 14, 15, and 16 are diagrams illustrating the internal mechanism of the print apparatus main body. FIG. 14 is a perspective view of the internal mechanism as viewed from the upper right. FIG. 15 is a perspective view of the internal mechanism as viewed from the upper left. FIG. 16 is a side sectional view of the print apparatus main body.

As seen in FIGS. 12 to 16, the sheet feeding section is composed of, for example, a plate on which print media are stacked, a sheet feeding roller M2080 that feed the print media one by one, a separating roller M2041 that separates the print medium, and a lever M2020 a returning lever M2020 that return the print media to the stacked position; these components are all attached to a base M2000.

A sheet feeding tray M2060 is attached to the base M2000 or cover to hold the stacked print media. The sheet feeding tray M2060 has multiple levels and is rotated during operation.

The sheet feeding roller M2080 is shaped like a bar having a circular cross section. One piece of separating roller rubber is provided close to stacked sheets to feed the print media. A force required to drive the sheet feeding roller M2080 is provided from a dedicated ASF motor E0105 provided in the sheet feeding section, via a transmission gear and a planetary gear (not shown in the drawings).

A movable side guide M2030 is movably provided on the plate M2010 to regulate the position where the print media are stacked. The plate M2010 can be rotated around a rotating shaft coupled to the base M2000. A plate spring 2012 urges the plate M2010 against the sheet feeding roller M2080. A separating sheet M2013 is provided in a site of the plate M2010 which is opposite the sheet feeding roller M2080 in order to prevent the print media from overlapping each other when only a small number of sheets remain; the separating sheet M2013 is consists of a material such as artificial leather which has a large coefficient of friction. The plate M2020 can abut and separate against and from the sheet feeding roller M2080.

A separating roller holder M2040 is installed on the base M2000 so as to be rotatable around a rotating shaft provided on the base M2000; a separating roller M2041 is attached to the separating roller holder M2040 to separating each print medium from the remaining ones. A separating roller spring (not shown in the drawings) urges the separating roller holder M2040 against the sheet feeding roller M2080. A clutch (not shown) is attached to the separating roller M2041. When a predetermined or larger load is imposed on the clutch, a part of the clutch is rotated to which the separating roller M2041 is attached. A separating roller release shaft M2044 and a control cam (not shown in the drawings) can abut and separate the separating roller M2041 against and from the sheet feeding roller M2080. An auto sheet feed sensor (referred to as an ASF sensor) E0009 senses the positions of the plate M2010, returning lever M2020 and separating roller M2041.

The returning lever M2020 is rotatably attached to the base M2000; the returning lever M2020 is used to return the print media to the stacked position. The returning lever M2020 is urged by a returning lever spring (not shown in the drawings) in a direction in which the returning lever is released. To return the print media, the control cam rotates the returning lever M2020.

Description will be given of a sheet feeding operation performed using the above configuration.

In a normal standby state, the plate cam releases the plate M2010. The control cam releases the separating roller M2041. Further, the returning lever M2020 is provided at the stacked position so that each print medium is returned to the stacked position and so that the lever closes a loading port so as to preclude the stacked print media from being moved inward.

To feed sheets, the motor first exerts a driving force to abut the separating roller M2041 against the sheet feeding roller M2080. The returning lever M2020 is then released and the plate M2010 abuts against the sheet feeding roller M2080. In this state, feeding of the print media is started. The print media are restricted by a front separating section (not shown in the drawings) provided on the base M2000. Only a predetermined number of print media are fed to a nip portion composed of the sheet feeding roller M2080 and separating roller M2041. In the nip portion, only the uppermost print medium is separated from the others and conveyed.

When the print medium reaches a conveying roller M3060 and a pinch roller M3070, the plate cam (not shown in the drawings) releases the plate M2010 and the control cam releases the separating roller M2041. The control cam also returns the returning lever M2020 to the stacked position. This causes the print media which has reached the nip portion composed of the sheet feeding roller M2080 and separating roller M2041 to return to the stacked position.

(B) Sheet Conveying Section

A chassis M1010 consists of hemmed sheet metal. The conveying roller M3060 conveying the print medium and a paper end sensor (simply referred to as a PE sensor below) E0007 are rotatively movably attached to the chassis M1010. The conveying roller M3060 is composed of a metal shaft coated with fine grains of ceramics. The conveying roller M3060 is attached to the chassis M1010 so that a bearing (not shown in the drawings) receives metal portions provided at the respective ends of the roller. A roller tension spring (not shown in the drawings) is provided between the bearing and the conveying roller M3060. Urging the conveying roller M3060 provides an appropriate amount of load during rotation to allow stable conveyance.

A plurality of pinch rollers M3070 abut against and follow the conveying roller M3060. The pinch rollers M3070 are held in a pinch roller holder M3000. A pinch roller spring (not shown in the drawings) urges the pinch rollers M3070 against the conveying roller M3060 to exert a force required to convey the print medium. In this case, a rotating shaft of the pinch roller holder M3000 is attached to the bearing of the chassis M1010 so that the pinch roller holder M3000 rotates around this position.

A paper guide flapper M3030 guiding the print medium and a platen M3040 are disposed at an inlet through which the print medium is conveyed. Further, a PE sensor lever M3021 is provided on the pinch roller holder M3000 to transmit detection of the leading and trailing end portions of the print medium to the PE sensor E0007. The platen M3040 is attached to and positioned on the chassis M1010. The paper guide flapper M3030 can be rotated around a bearing portion (not shown in the drawings). The paper guide flapper M3030 is positioned by abutting against the chassis M1010. Further, the bearing portion is fitted on the conveying roller M3060 and moves slidably.

A print head H1001 (not shown in the drawings) is provided downstream of the conveying roller M3060 in the direction in which the print medium is conveyed.

Description will be given of a conveying process with the above configuration. The pinch roller holder M3000 and paper guide flapper M3030 guide the print medium fed to the sheet conveying section, to the roller pair of the conveying roller M3060 and pinch roller M3070. At this time, the PE sensor lever M3021 senses the leading end portion of the print medium to determine the print position for the print medium. The driving force of an LF motor E0002 rotates the roller pair consisting of the conveying roller M3060 and pinch roller M3070 to convey the print medium on the platen M3040. A rib constituting a conveyance reference plane is formed on the platen M3040. The rib manages the gap between the print head H1001 and the surface of the print medium. The rib, in cooperation with a sheet discharging section, described below, also suppress waving of the print medium. Further, a sponge portion (not shown in the drawings) is also provided on the platen M3040 so that when the leading or trailing end portion of the print medium is printed, printing elements arranged at the position corresponding to the sponge portion are used to form an image.

A driving force required to rotate the conveying roller M3060 is obtained by transmitting the rotating force of the LF motor E0002, consisting of, for example, a DC motor, to a pulley M3061 via a timing belt (not shown in the drawings); the pulley M3061 is disposed on a shaft of the conveying roller M3060. Further, a cord wheel M3062 is provided on a shaft of the conveying roller M3060 to detect the conveying amount of the print medium by the conveying roller M3060. An encode sensor M3090 is disposed on the chassis M1010, located adjacent to the cord wheel M3062, to read markings formed on the cord wheel M3062 The markings are formed on the cord wheel M3062 at a pitch of 150 to 300 lpi (lines/inch).

(C) Sheet Discharging Section

The sheet discharging section is composed of a first sheet discharging roller M3100 and a second sheet discharging roller 3110, a plurality of spurs M3120, and a gear train.

The first sheet discharging roller M3100 is composed of a metal shaft on which plural pieces of rubber portions are provided. The first sheet discharging roller M3100 is driven by transmitting the driving force of the conveying roller M3060 to the first sheet discharging roller M3100 via an idler gear.

The second sheet discharging roller M3110 is composed of a resin shaft to which a plurality of elastomers M3111 are attached. The second sheet discharging roller M3110 is driven by transmitting the driving force of the first sheet discharging roller M3110 to the second sheet discharging roller M3110 via an idler gear.

Each of the spurs M3120 is composed of a circular thin plate consisting of, for example, SUS and having a plurality of convexes provided around its periphery, the thin plate being integrated with a resin portion. The plurality of spur M3120 are attached to a spur holder. This attachment is achieved by spur springs each composed of a coil spring formed like a bar. The spring force of the spur spring also abuts spur M3120 against the sheet discharging rollers M3100 and M3110 at a predetermined pressure. This configuration enables the spur M3120 to rotate in unison with the two sheet discharging rollers M3100 and M3110. Some of the spurs M3120 are provided at the positions of the rubber portions of the first sheet discharging roller M3100 or at the positions of the elastomers M3111 of the second sheet discharging roller M3110. The major role of these spurs is to exert a force required to convey the print medium. Other spurs are provided at positions free from the rubber portions and elastomers M3111. The major role of these spurs is to suppress floating of the print medium.

The gear train transmits the driving force of the conveying roller M3060 to the sheet discharging rollers M3100 and M3110.

A sheet end support (not shown in the drawings) is provided between the first sheet discharging roller M3100 and the second sheet discharging roller M3110. The sheet end support raises the opposite ends of the print medium so that the tip of the first sheet discharging roller M3100 can hold the print medium. The sheet end support thus protects print on the print medium from scratching by the carriage. Specifically, a sheet end support spring (not shown in the drawings) urges a resin member having a roller (not shown in the drawings) provided at its tip, to press the roller against the print medium at a predetermined pressure. The opposite ends of the print medium are thus raised to make the print medium sturdy. The print medium can thus be held at a predetermined position.

With the above configuration, the print medium on which an image has been formed is placed in the nip between the first sheet discharging roller M3110 and the spurs M3120. The print medium is further conveyed and discharged to a sheet discharging tray M3160. The sheet discharging tray M3160 is divided into a plurality of pieces and can be housed at the bottom of a lower case M7080, described below. In operation, the sheet discharging tray M3160 is withdrawn. Furthermore, the sheet discharging tray M3160 is designed so that its height creases toward its tip and so that its opposite ends are held high. This allows the discharged print media to be more appropriately stacked, thus preventing the printing surfaces from rubbing against each other.

(D) Carriage Section

The carriage section has a carriage M4000 on which the print head H1001 is mounted. The carriage M4000 is supported by a guide shaft M4020 and a guide rail M1011. The guide shaft M4020 is attached to the chassis M1010 to guide and support the carriage M4000 so that the carriage M4000 is reciprocated and scanned in a direction perpendicular to the print medium conveying direction. The guide rail M1011 is integrated with the chassis M1010 to hold a trailing end portion of the carriage M400 to maintain a gap between the print head H1001 and the print medium. Further, a sliding sheet M4030 consisting of a thin plate such as stainless steel is extended on a side of the guide rail M1011 on which the carriage M4000 slides. The sliding sheet M4030 thus reduces sliding sounds from the print apparatus.

A carriage motor E0001 mounted on the chassis M1010 drives the carriage M4000 via a timing belt M4041. An idle pulley M4042 extends and supports the timing belt M4041. Moreover, the timing belt M4041 is coupled to the carriage M4000 via a carriage damper consisting of rubber or the like. This attenuates the vibration of the carriage motor E0001 or the like to reduce, for example, the unevenness of printed images.

An encoder scale E0005 is provided parallel to the timing belt M4041 to detect the position of the carriage M4000. Markings are formed on the encoder scale E0005 at a pitch of 150 to 300 lpi. An encoder sensor E0004 (described below in detail with reference to FIG. 17) that reads the markings is provided on a carriage substrate E0013 mounted on the carriage M4000. A head connector E0101 is also provided on the carriage substrate E0013 for an electric connection to the print head H1001. Further, the carriage M4000 connects to a flexible cable E0012 (not shown in the drawings; described below in detail with reference to FIG. 17) that transmits a driving signal from an electric substrate E0014 to the print head H1001.

As an arrangement for fixing the print head H1001 to the carriage M4000, an abutting portion (not shown in the drawings) and pressing means (not shown in the drawings) are provided on the carriage M4000; the abutting portion positions the print head H1001 while pressing it against the carriage M4000 and the pressing means fixes the print head H1001 at a predetermined position. The pressing means is mounted on a head set lever M4010. To set the print head H1001, the head set lever M4010 is rotated around a rotation supporting point to act on the print head H1001.

Moreover, a position detecting sensor M4090 consisting of a reflective optical sensor is attached to the carriage M4000; the position detecting sensor M4090 is used when recording is carried out on a special medium such as a CD-R or to detect the result of printing or a position such as the end of the sheet. The position detecting sensor M4090 can detect the current position of the carriage M4000 by using a light emitting element to emit light and receiving the reflected light.

To form an image on the print medium using the above configuration, the roller pair consisting of the conveying roller M3060 and pinch rollers M3070 conveys and positions the print medium for a row position. For a column position, the carriage motor E0001 moves the carriage M4000 in the direction perpendicular to the conveying direction, to locate the print head H1001 at the position where the image is to be formed. The positioned print head H1001 ejects ink to the print medium in accordance with a signal from the electric substrate E0014. A detailed description will be given of the configuration of the print head H1001 and a printing system. The print apparatus according to the present embodiment forms an image on the print medium by alternately repeating a printing main scan that scans the carriage M4000 across the columns while using the print head H1001 to carry out printing and a sub-scan that uses the conveying roller M3060 to convey the print medium across the rows.

(E) Cleaning Section

The cleaning section is composed of, for example, a pump M5000 used to clean the print head H1001, a cap M5010 that hinders the print head H1001 from drying, and a blade M5020 used to clean a surface of the print head H1001 on which ejection openings are formed.

A dedicated cleaning motor E0003 is disposed in the cleaning section. The cleaning motor E0003 is provided with a one-way clutch (not shown in the drawings). Rotating the motor E0003 in one direction actuates the pump. Rotating the motor E0003 in the other direction operates the blade M5020. Concurrently, the cap M5010 performs a rising or lowering operation.

The pump M5000 is configured so that pump rollers (not shown in the drawings) squeeze two tubes (not shown in the drawings) to generate a negative pressure. The cap M5010 is connected to the pump M5000 via a valve (not shown in the drawings). When the pump M5000 is operated with the cap M5010 in tight contact with the ink ejection openings in the print head H1001, unwanted ink or the like is sucked from the print head H1001. Moreover, a cap absorber M5010 is provided inside the cap M5010 to reduce the amount of ink remaining on a face of the head H1001 after suction. Further, the ink remaining on the cap M5010 is sucked with the cap M5010 open, to avoid fixation of the remaining ink and the subsequent problems. The ink sucked by the pump M5000 is disposed of and absorbed by a waste ink absorber provided in the lower case M7080.

A main cam (not shown in the drawings) having a plurality of cams provided on a shaft controls a series of operations such as the operation of blade, the elevation and lowering of the cap M5010 and the opening and closing of the valve which are continuously performed. The main cam acts on a cam and an arm in each site to enable a predetermined operation to be performed. A position detecting sensor such as a photo interrupter can detect the position of the main cam. To lower the cap M5010, the blade M5020 moves in the direction perpendicular to the carriage scanning direction to clean the face of the print head H1001. A plurality of the blades M5020 are provided so that one of them cleans the vicinity of the printing elements in the print head H1001, whereas the other cleans the entire face. Once the carriage M4000 moves to the innermost position, it abuts against the blade cleaner M5060 to enable removal of ink adhering to the blades M5020 themselves.

(F) Sheath Section

The units described in (A) to (E) are mostly incorporated into the chassis M1010 to form a mechanism section of the print apparatus. The exterior is mounted so as to cover the periphery of the mechanism section. The exterior section is mainly composed of a lower case M7080, an upper case M7040, an access cover M7030, a connector cover, and a front cover M7010.

A sheet discharging tray rail is provided below the lower case M7080 so that the pieces of the sheet discharging tray M3160 can be housed in the lowercase M7080. The front cover M7010 closes a sheet discharging port while the apparatus is out of operation.

The access cover M7030 is attached to the upper case M7040 and is rotatively movable. A part of top surface of the upper case has an opening so that at this position, any ink tank H1900 and the print head H1001 can be replaced with new ones. The print apparatus according to the present embodiment has a head cartridge configuration in which different ink tanks H1900 for the respective colors are independently detachable in association with a print head unit in which a plurality of print heads that can eject different color inks are integrated together. Moreover, the upper case is provided with, for example, a door switch lever (not shown in the drawings) used to sense that the access cover is opened or closed, a LED guide M7060 that transmits and displays light from a LED, and a key switch M7070 that acts on a switch (SW) on the substrate. Further, a multi-level sheet feeding tray M2060 is rotatively movably mounted. When the sheet feeding section is not used, the sheet feeding tray M2060 is housed in the sheet feeding section, covering the sheet feeding section.

The upper case M7040 and the lower case M7080 are attached to each other using resilient fitting pawls. A connector cover (not shown in the drawings) covers the area between the upper case M7040 and the lower M7080 in which a connector is provided.

(Configuration of Electric Circuit)

Now, description will be given of the configuration of an electric circuit according to the present embodiment.

Figure 17:
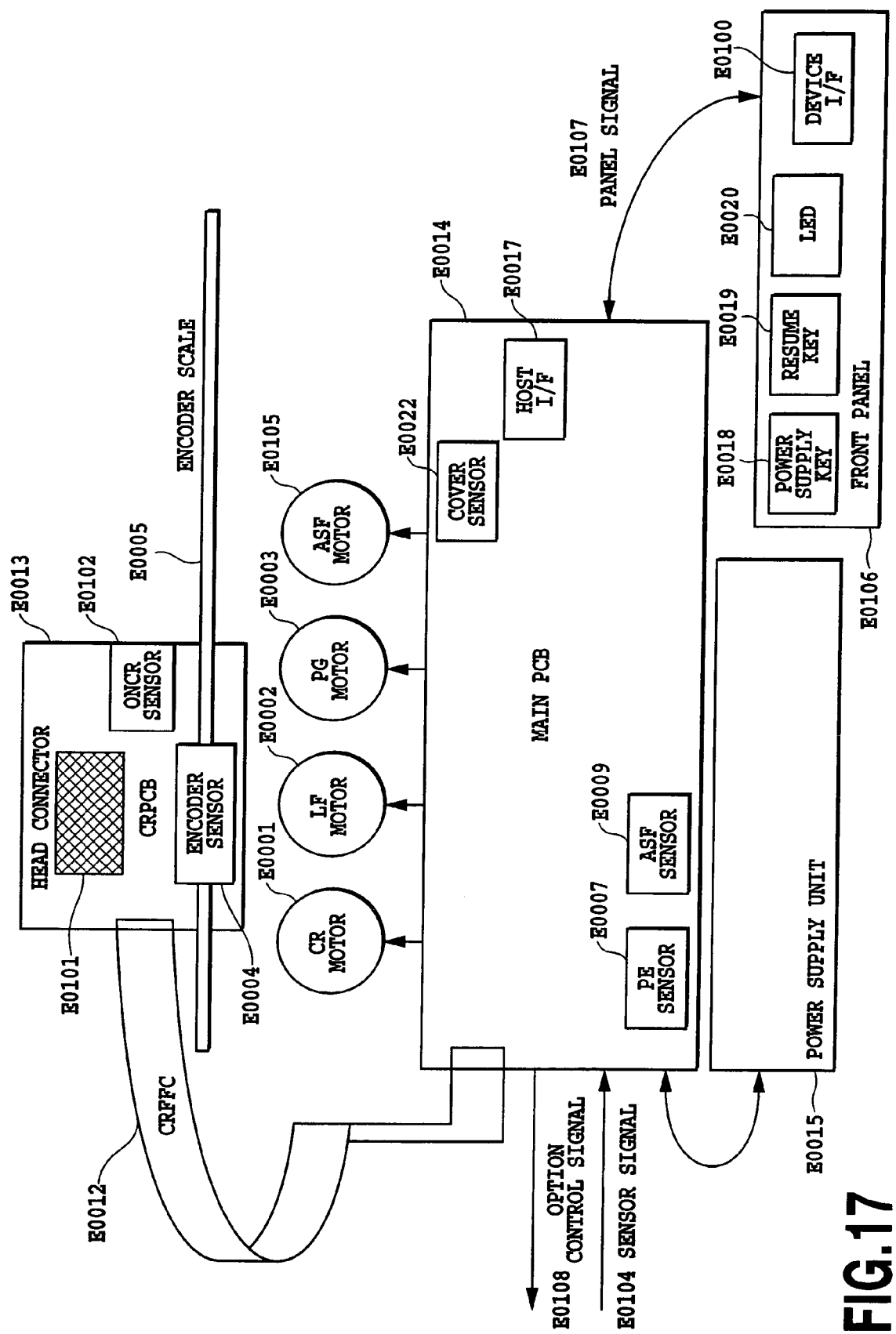
FIG. 17 is a block diagram schematically showing the general configuration of an electric circuit according to the embodiment of the present invention.

FIG. 17 is a block diagram schematically illustrating the general configuration of the electric circuit according to the embodiment of the present invention.

In the print apparatus used in the present embodiment, the electric circuit is mainly composed of, for example, a carriage circuit board E0013, a main PCB (Printed Circuit Board) E0014, a power supply unit E0015, and a front panel E0106.

Here, the power supply unit E0015 is connected to the main PCB E0014 to supply various types of driving power.

The carriage circuit board E0013 is a printed circuit board unit mounted on the carriage M4000. The carriage circuit board E0013 functions as an interface that transmits and receives signals to and from the print head H1001 through the head connector E0101. Further, on the basis of a pulse signal output by the encoder sensor E0004 as the carriage M4000 moves, the carriage circuit board E0013 detects the positional relationship between the encoder scale E0005 and the encoder sensor E0004. The carriage circuit board E0013 further outputs the resulting output signal to the main PCB E0014 through a flexible flat cable (CRFFC) E0012. The carriage circuit board E0013 is provided with a temperature sensor such as a thermistor which detects ambient temperature and a required optical sensor (these sensors will be referred to as an OnCR sensor E0102 below). Information obtained by the OnCR sensor E0102 is output to the main PCB E0014 through the flexible flat cable (CRFFC) E0012 together with head temperature information from the print head cartridge H1000.

The main PCB E0014 is a printed circuit board that drivingly controls each section of the ink jet print apparatus according to the present embodiment. The following are provided on the circuit board: a paper end detecting sensor (PE sensor) E0007, an automatic sheet feeder (ASF) sensor E0009, a cover sensor E0022, and a host interface (host I/F) E0017. The main PCB E0014 is connected to various motors such as the carriage motor E0001, which serves as a driving source for the main scanning of the carriage M4000, an LE motor E0002 serving as a driving source for conveyance of the print medium, a PG motor E0003 serving as a driving source for an operation of recovering the print head H1001, and a ASF motor E0105 serving as a driving source for an operation of feeding the print medium. The main PCB E0014 further receives various sensor signals E0104 indicative of the installation statuses and operational statuses of various option units such as an ink empty sensor, a media (paper) determining sensor, a carriage position (height) sensor, an LF encoder sensor, and a PG sensor. The main PCB E0014 further outputs option control signals E0108 to drivingly control the various option units. The main PCB E0014 also has an interface connected to the CRFFC E0012, the power supply unit E0015, and the front panel E0106 to transmit and receive information to and from these units using a panel signal E0107.

The front panel E0106 is a unit provided on the front surface of the print apparatus main body to allow the user to operate the apparatus easily. The front panel E0106 has a resume key E0019, a LED E0020, a power supply key E0018, and a device I/F E0100 used for connection to a peripheral device such as a digital camera.

Figure 18:
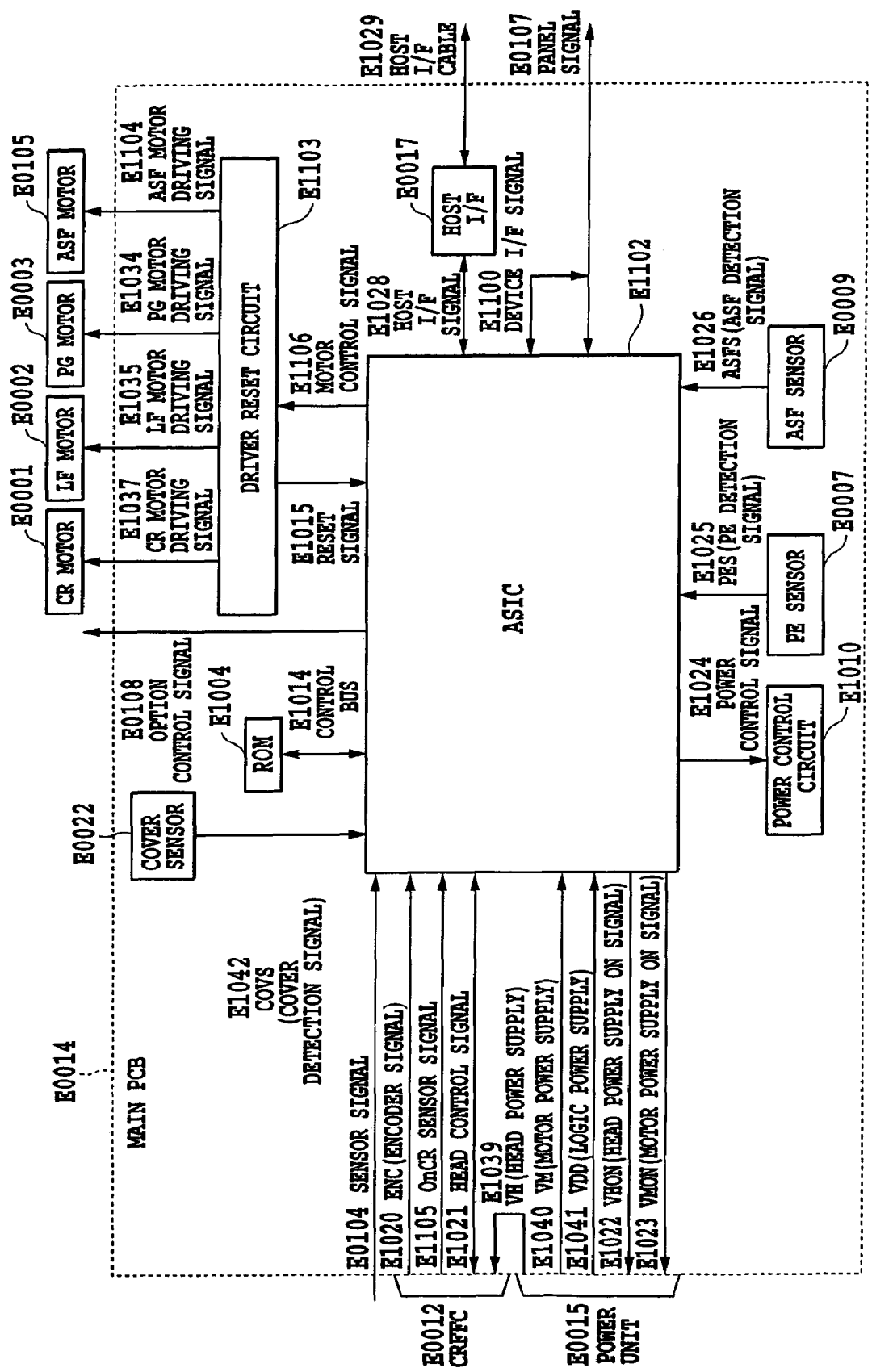
FIG. 18 is a block diagram showing an example of the internal configuration of a main PCB.

FIG. 18 is a block diagram showing the internal configuration of the main PCB E1004.

In the figure, reference numeral E1102 denotes an ASIC (Application Specific Integrated Circuit) connected to a ROM E1004 to perform various types of control in accordance with programs stored in the ROM E1004. The ASIC E1102 detects, for example, outputs from the sensors on the main PCB E1004, an OnCR sensor signal E1105 and an encoder signal E1020 from the OnCR sensor and encoder on the CRPCB E0013, and the statuses of outputs from the power supply key E0018 and resume key E1109 on the front panel E0106. Further, on the basis of the connection status of the device I/F E0100 on the front panel and a data input status, the ASIC E1102 executes various logical calculations and condition determinations, controls various components, and drivingly controls the ink jet print apparatus.

Reference numeral E1103 denotes a driver reset circuit that uses a motor power source (VM) E1040 as a driving source to generate a CR motor driving signal E1037, an LF motor driving signal E1035, a PG motor driving signal E1034, and an ASF motor driving signal E1104 in accordance with a motor control signal E1106. The driver reset circuit E1103 thus drives the motors. Moreover, the driver reset circuit E1103 has a power supply circuit that supplies required power to the main PCB E0014, the CRPCB E0013, the front panel E0106, and other sections. The driver reset circuit E1103 further detects a decrease in power supply voltage to generate a reset signal E1015 for initialization.

Reference numeral E1010 denotes a power supply control circuit that controls power supplies to the sensors or the like having light emitting elements, in accordance with a power supply control signal E1024 from the ASIC E1102.

The host I/F E0017 transmits a host I/F signal E1028 from the ASIC E1102 to an externally connected host I/F cable E1029. The host I/F E0017 also transmits a signal from the cable E1029 to the ASIC E1102.

On the other hand, the power supply unit E0015 supplies a head power supply (VH) E1039, a motor power supply (VM) E1040, and a logic power supply (VDD) E1041.

Further, a head power supply ON signal (VHON) E1022 and a motor power supply ON signal (VMON) E1023 from the ASIC E1102 are input to the power supply unit E0015 to control turn-on and -off of the head power source E1039 and motor power source E1040, respectively. The logic power supply (VDD) E1041 from the power supply unit E0015 has its voltage converted as required before being provided to the internal and external sections of the main PCB E0014.

The head power supply signal E1039 is smoothed on the main PCB E0014 and then transmitted to the CRFFC E0012, where it is used to drive the print head cartridge H1000.

The ASIC E1102 is a semiconductor integrated circuit contained in an arithmetic processing device in one chip. The ASIC E1102 outputs the motor control signal E1106, the option control signal E0108, the power supply control signal E1024, the head power supply ON signal E1022, the motor power supply ON signal E1023, and the like. The ASIC E1102 then transmits and receives signals to and from the host I/F E0017 and also transmits and receives signals to and from the device I/F E0100 on the front panel through the panel signal E0107. Moreover, the ASIC E1102 senses the statuses of a PE detection signal (PES) E1025 from the PE sensor E0007, an ASF detection signal (ASFS) E1026 from the ASF sensor E0009, a cover detection signal (COVS) E1042 from the cover sensor E0022, the panel signal E0107, the sensor signal E0104, and the OnCR sensor signal E1105. The ASIC E1102 thus drivingly controls the panel signal E0107 to blink the LED E0020 on the front panel.

Moreover, the ASIC E1102 senses the status of the encoder signal (ENC) E1020 to generate a timing signal. The ASIC E1102 uses the head control signal E1021 to interface the print head cartridge H1000 to control the printing operation. In this case, the encoder signal (ENC) E1020 is an output signal from the CR encoder sensor E0004, which is input through the CRFFC E0012. The head control signal E1021 is supplied to the print head H1001 via the flexible flat cable E0012, the carriage substrate E0013, and the head connector E0101.

Figure 19B:
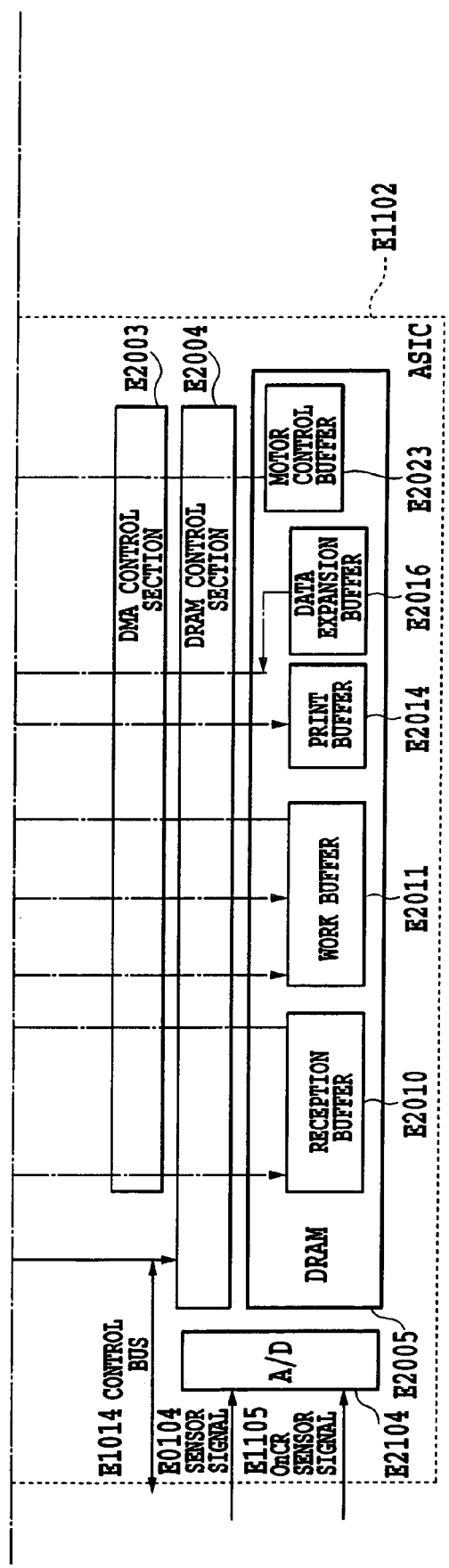
FIG. 19B is a block diagram showing the internal configuration of an ASIC.

FIGS. 19, 19A and 19B are diagrams showing an example of the internal configuration of the ASIC E1102. For the connections between the blocks, the figure shows only the flow of data such as print data and motor control data which concerns the control of the head and the mechanism parts of each section. The following are omitted to prevent the drawing from being complicated: control signals relating to read and write operations performed on registers contained in the blocks and to control of clocks and DMA.

In the figure, reference numeral E2107 denotes a clock control section to which a clock signal (CLK) E2031 from a clock oscillation circuit (not shown in the drawings) is input. The clock control section E2107 converts the frequency of the clock signal as required to generate a clock (not shown in the drawings) supplied to most of internal components of the ASIC E1102.

Reference numeral E2012 denotes a CPU that controls read and write operations performed on registers in each blocks described below, in accordance with the reset signal E1015 and an interrupt signal E2034 output by each blocks in the ASIC, and a control signal from a control bus E1014. The CPU E2012 also supplies a clock to some of the blocks and accepts the interrupt signal (these operations are not shown in the drawings). Moreover, the CPU E2102 has an internal RAM and receives a print file from an external device through the device I/F E0100 to convert the print file into print data.

Reference numeral E2005 denotes a DRAM which serves as a data buffer for printing and which has various regions such as a receive buffer E2010, a work buffer E2011, a print buffer E2014, and a decompression data buffer E2016. The DRAM E2005 also has a motor control buffer E2023 to control the motors.

The DRAM E2005 is also used as a word area required for the CPU E2102 to operate. That is, a DRAM control section E2004 controllably switches between an access from the CPU E2102 to the DRAM E2005 through the control bus and an access from a DMA control section E2003, described below, to the DRAM E2005 through the control bus so that read and write operations can be performed on the DRAM E2005.

The DMA control section E2003 receives a request signal (not shown in the drawings) from each block. For a write operation, the DMA control section E2003 outputs write data E2038, E2041, E2042, E2044, and the like to the DRAM control section together with an address signal and a control signal (not shown in the drawings) for a DRAM access. For a read operation, the DMA control section E2003 receives and passes read data E2040, E2043, E2045, E2051, and the like from the DRAM control section E2004 to a requesting block.

Reference numeral E2007 denotes a universal serial bus (USB) that serves as a bidirectional communication interface with an external host apparatus (not shown in the drawings) through the host I/F E0017 under the control of the CPU E2102. Moreover, for a printing operation, the universal serial bus device E2007 receives and passes receive data (host receive data E2037) from the host I/F E0017 to a receive control section E2008.

Reference numeral E2101 denotes a USB host that serves as a bidirectional communication interface with an external host apparatus (not shown in the drawings) through the device I/F E0100 under the control of the CPU E2102. Moreover, for a printing operation, the USB host E2101 executes a DMA process to receive and pass receive data (host receive data E2108) from the device I/F E0100 to the receive control section E2008. The receive control section E2008 writes selected receive data ((WDIF) E2038) from the USB device E2007 or USB host E2101 to a receive buffer write address managed by a receive buffer control section E2039.

Reference numeral E2009 denotes a compression and decompression DMA controller that reads, under the control of the CPU E2102, receive data (raster data) stored in the receive buffer E2010 from a receive buffer read address managed by the receive buffer control section E2039. The compression and decompression DMA controller E2009 further compresses or decompresses the data (RDWK) E2040 in accordance with a specified mode. Print codes obtained are rearranged into addresses on the work buffer E2011 which are suitable for the order of data transfer to the print head cartridge H1000. The addresses are then transferred and written in a work buffer area as a print code sequence WDWK E2041.

Reference numeral E2013 denotes a print buffer transfer DMA controller that reads and transfers (WDWP E2044) the print code (RDWP) E2043 on the work buffer E2011 to the print buffer E2014 under the control of the CPU E 2102. Reference numeral E2012 denotes a DMA controller that repeatedly writes, under the control of the CPU E2102, the specified work fill data (WDWF) E2042 in an area on the work buffer on which the transfer by the print buffer transfer DMA controller E2013 has been completed.

Reference numeral E2015 denotes a print data decompression DMA controller that reads, under the control of the CPU E2102, a print code written on the print buffer and decompression data (decompression print data EDHDG E2045) written on the decompression data buffer E2016, using a data decompression timing signal E2050 from a head control section E2018 as a trigger. Moreover, the print data decompression DMA controller E2015 writes the read data to a column buffer E2017 as column buffer write data (WDHDG) E2047. Here, the column buffer E2017 is a SRAM that temporarily stores transfer data (decompression print data) to be transferred to the print head cartridge H1000. The column buffer E2017 is shared and managed by the print data decompression DMA controller E2015 and head control section E2018 using a handshake signal (not shown in the drawings) for these blocks.

Reference numeral E2018 denotes the head control section that interfaces with the print head cartridge H1000 via a head control signal under the control of the CPU E2102. The head control section outputs a data decompression timing signal E2050 to the print data decompression DMA controller on the basis of a head driving timing signal E2049 from a sensor signal processing section E2022. Moreover, for a print operation, the head control section E2018 reads decompression print data (RDHD) E2048 from the column buffer and outputs the data to the print head cartridge H1000 as a head control signal E1021.

Reference numeral E2022 is the sensor signal processing section that receives the sensor signal E0104, the OnCR sensor signal E1105, the PE detection signal E1025, the ASE detection signal E1026, and the cover detection signal E1042. The sensor signal processing section E2022 then transmits these pieces of information to the CPU E2102 in accordance with a mode specified under the control of the CPU E2102. The sensor signal processing section E2022 also outputs a sensor detection signal E2052 to the motor control section E2013. Moreover, the sense signal processing section E2022 receives an encoder signal (ENC) and outputs a head driving timing signal E2049 in accordance with a mode specified under the control of the CPU E2102. The sense signal processing section E2022 stores, in the registers, information on the position and speed of the carriage M4001 obtained from the encoder signal E1020 and provides the information to the CPU E2102. On the basis of this information, the CPU E2102 determines various parameters for the control of the CR motor E0001. Similarly, the sensor signal processing section E2022 receives an LE encoder sensor signal constituting the sensor signal E0104 to store information on sheet feeding position and speed in the registers. The sensor signal processing section E2022 then provides the information to the CPU E2102. On the basis of this information, the CPU E2102 determines various parameters for the control of the LF motor E0002.

Reference numeral E2104 denotes an A/D converter that converts the following analog signals into digital values: a media determination sensor output and an ink empty sensor output constituting the sensor signal E0104 and an environmental temperature detecting thermistor output, a reflective sensor output, and a head temperature detection output constituting the OnCR sensor signal E1105. The A/D converter then transmits these pieces of sensor detection information to the CPU E2102 in accordance with a mode specified under the control of the CPU E2102.

Under the control of the CPU E2102, a motor control section E2103 reads a motor driving table (RDPM) E2051 from the motor control buffer 2023 on the DRAM E2005 to output the motor control signal E1106. The motor control section E2103 uses various sensor detection signals as control triggers to output the motor control signal E1106 depending on the operation mode.

Reference numeral E2105 denotes a panel I/F section that outputs a LED control signal constituting the panel signal E0107 under the control of the CPU E2102. The panel I/F section E2105 receives and transmits status output signals for the power supply key and resume key constituting the panel signal, to the CPU E2102. Reference numeral E2029 denotes a port control section outputs the head power supply ON signal E1022, the motor power supply ON signal E1023, and the power supply control signal E1024.

(Configuration of Print Head)

Description will be given below of the configuration of the head cartridge H1000 used in the present invention. The head cartridge H1000 according to the present embodiment has the print head H1001, means in which the ink tanks H1900 are mounted, and means for supplying ink from the ink tanks H1900 to the print head. The head cartridge H1000 is detachably mounted on the carriage M4000.

Figure 20:
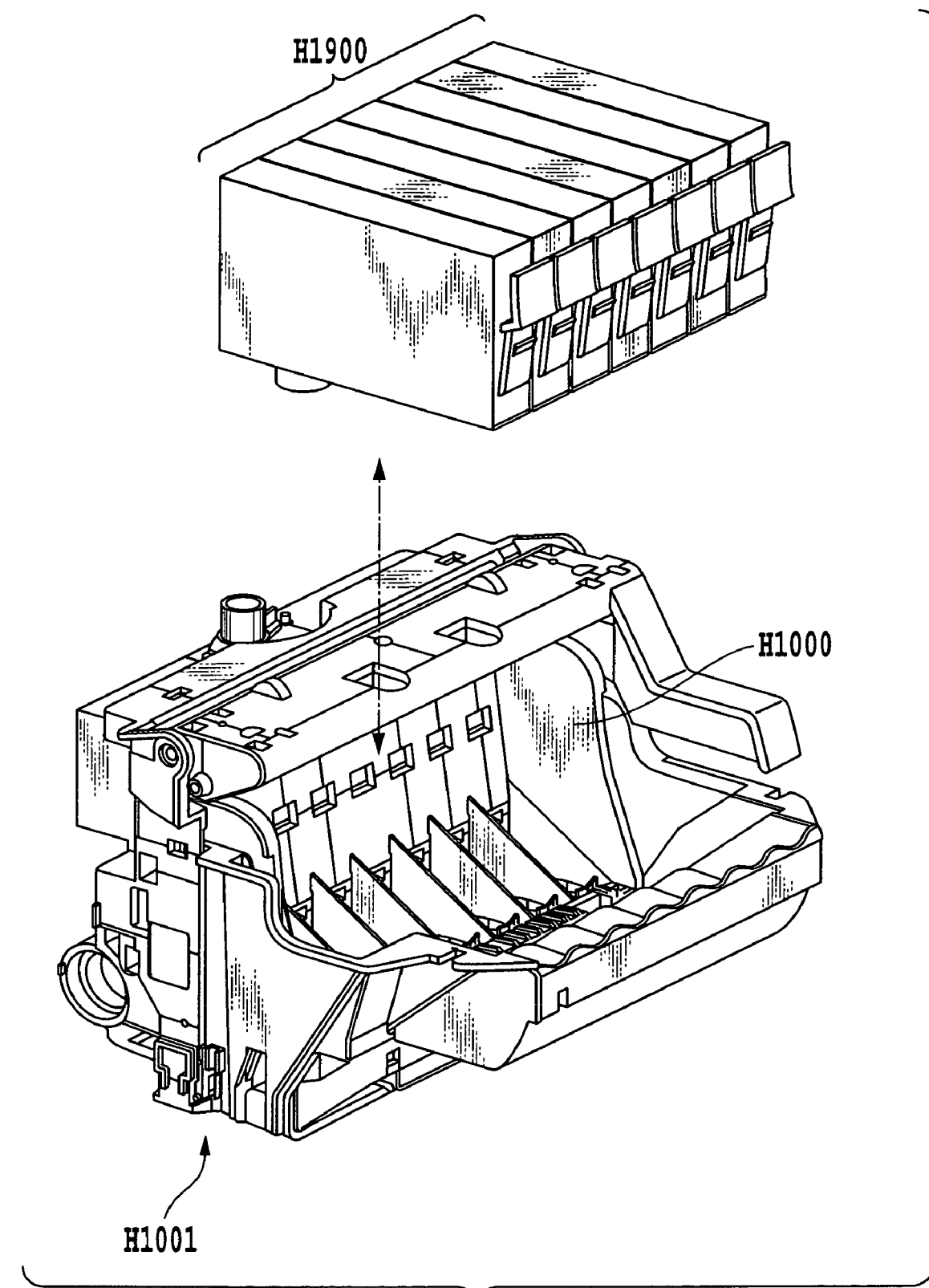
FIG. 20 is a perspective view showing that an ink tank is being installed in a head cartridge used in the embodiment of the present invention.

FIG. 20 is a diagram showing that the ink tank H1900 is being installed in the head cartridge H1000 used in the present embodiment. The print apparatus according to the present embodiment uses ink in seven colors, cyan, magenta, yellow, black, red, green, and blue. Accordingly, seven independent ink tanks H1900 for the respective colors are provided. As shown in the figure, each of the ink tanks H1900 can be detached from and attached to the head cartridge H1000. The ink tanks H1900 can be detached from and attached to the head cartridge H1000 mounted on the carriage M4000.

Figure 21:
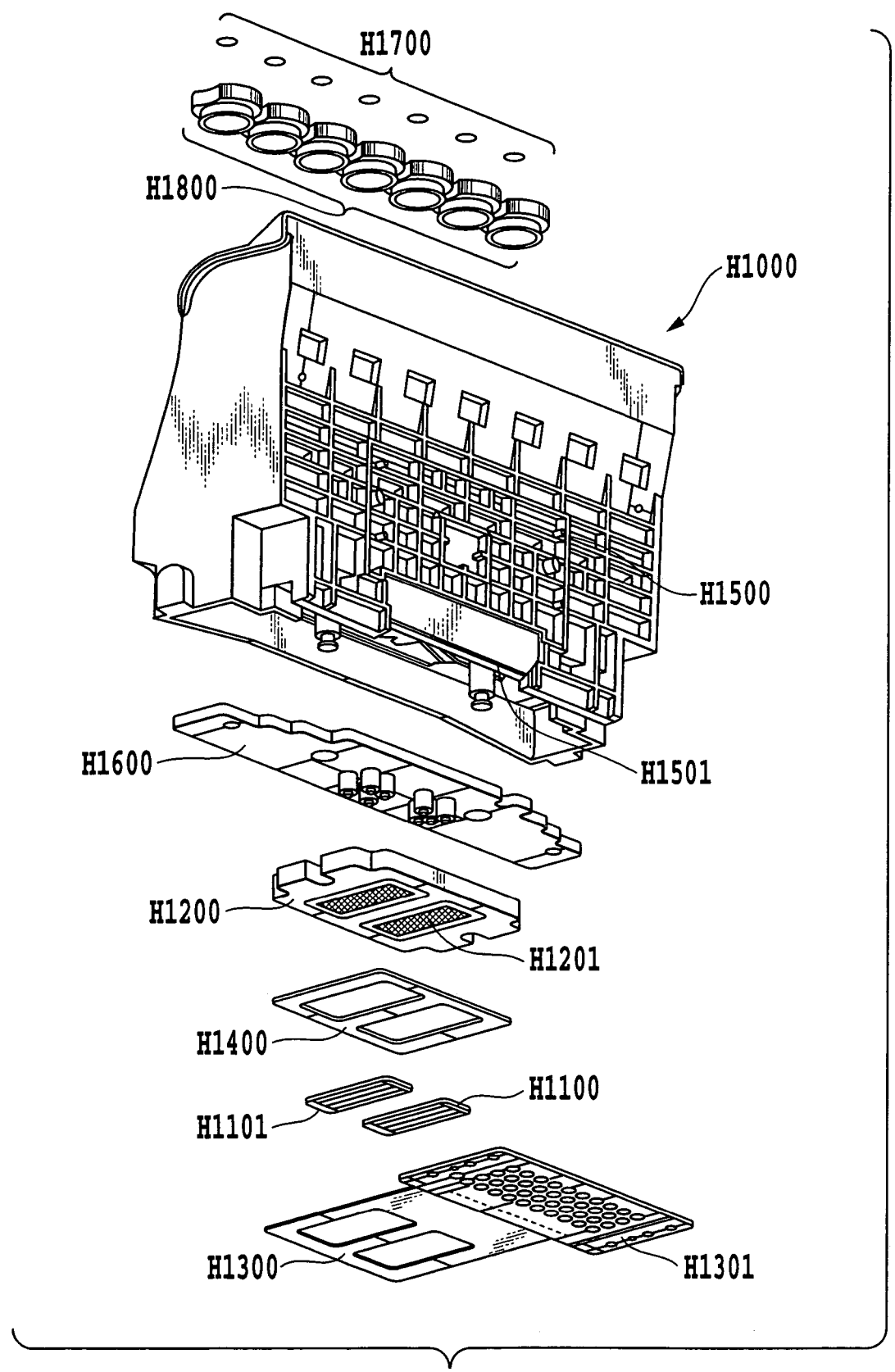
FIG. 21 is an exploded perspective view of the head cartridge used in the embodiment of the present invention.

FIG. 21 is an exploded perspective view of the head cartridge H1000. In the figure, the head cartridge H1000 is composed of, for example, a first printing element substrate H1100 and a second printing element substrate H1101, a first plate H1200, a second plate H1400, an electric wiring substrate H1300, a tank holder H1500, a channel forming member H1600, a filter H1700, and seal rubber H1800.

The first printing element substrate H1100 and the second printing element substrate H1101 are each an Si substrate having a plurality of printing elements for ejecting ink formed on one surface by a photolithography technique. Electric wiring such as Al is formed by a deposition technique; each printing element is supplied with power through the electric wiring. A plurality of ink channels corresponding to the individual printing elements are also formed by the photolithographic technique. Moreover, ink supply ports are opened in the back surface of each of the printing element substrates; ink is supplied to the plurality of ink channels through the ink supply ports.

Figure 22:
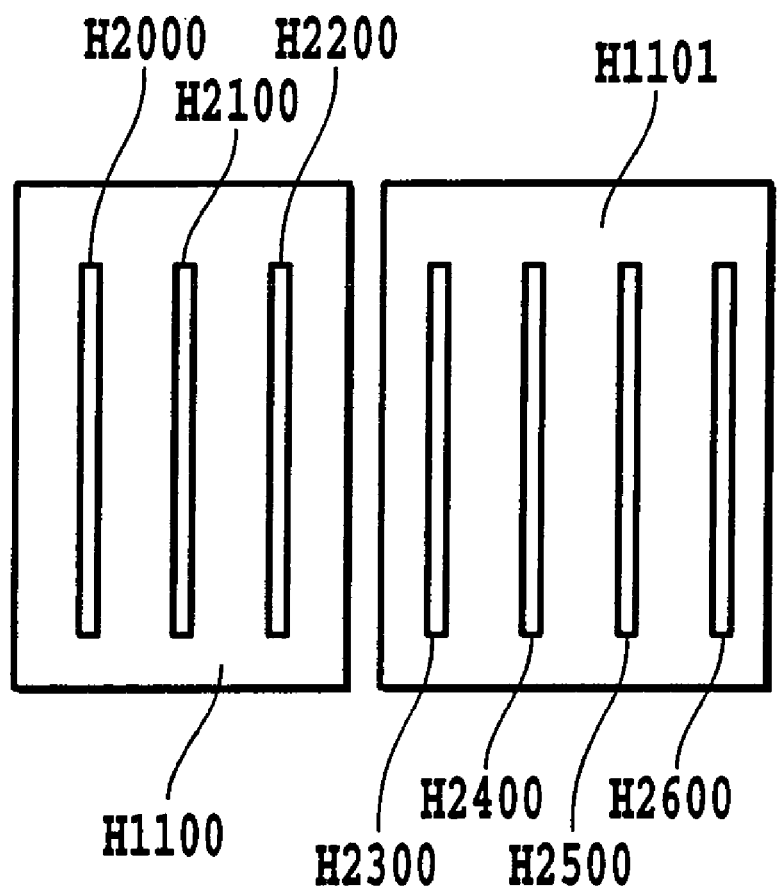
FIG. 22 is a front view showing a printing element substrate in the head cartridge used in the embodiment of the present invention.

FIG. 22 is an enlarged front view illustrating the configuration of the first printing element substrate H1100 and second printing element substrate H1101. Reference numerals H2000 to H2600 denote printing element rows corresponding to different ink colors. The printing element rows for three colors are formed in the first printing element substrate H1100: the printing element row H2000 to which cyan ink is supplied, the printing element row H2100 to which magenta ink is supplied, and the printing element row H2200 to which yellow ink is supplied. The printing element rows for four colors are formed in the second printing element substrate H1101: the printing element row H2300 to which black ink is supplied, the printing element row H2400 to which red ink is supplied, the printing element row H2500 to which green ink is supplied, and the printing element row H2600 to which blue ink is supplied.

Each of the printing element rows is composed of 768 printing elements arranged at intervals of 1,200 dpi (dot/inch) in the print medium conveying direction. Each printing element ejects about 2 picolitters of ink. The opening area of each printing element ejection port is set at about 100 $\mu m^2$. Further, the first printing element substrate H1100 and the second printing element substrate H1101 are fixedly bonded to a first plate H1200. An ink supply port H1201 is formed in the first plate H1200 so that ink is supplied to the first printing element substrate H1100 and second printing element substrate H1101 through the ink supply port H1201.

Moreover, a second plate H1400 with openings is fixedly bonded to the first plate H1200. The second plate H1400 holds an electric wiring substrate H1300 so that the electric wiring substrate H1300 can be electrically connected to the first printing element substrate H1100 and second printing element substrate H1101.

The electric wiring substrate H1300 applies an electric signal causing each of the printing elements formed in the first printing element substrate H1100 and second printing element substrate H1101 to eject ink. The electric wiring substrate H1300 has electric wiring corresponding to the first printing element substrate H1100 and second printing element substrate H1101 and an external signal input terminal H1301 located at an end of the electric wiring to receive an electric signal from the print apparatus main body. The external signal input terminal H1301 is positioned on and fixed to a rear surface of the tank holder H1500.

On the other hand, the channel forming member H1600 is fixed to the tank holder H1500 holding the ink tanks H1900 by, for example, ultrasonic welding. This forms an ink channel H1501 extending from the ink tanks H1900 to the first plate H1200.

A filter H1700 is provided at an ink tank-side end of the ink channel H1501, engaged with the ink tanks H1900, to prevent entry of external dust. Seal rubber H1800 is installed in the engaging portion between the filter H1700 and the ink tanks H1900 to make it possible to prevent ink from being evaporated from the engaging portion.

Moreover, the head cartridge H1000 is constructed by using an adhesive or the like to couple together a tank holder section composed of the tank holder H1500, channel forming member H1600, filter H1700, and seal rubber H1800 and the print head section H1001 composed of the first printing element substrate H1100 and second printing element substrate H1101, first plate H1200, electric wiring substrate H1300, and second plate H1400.

Figure 23:
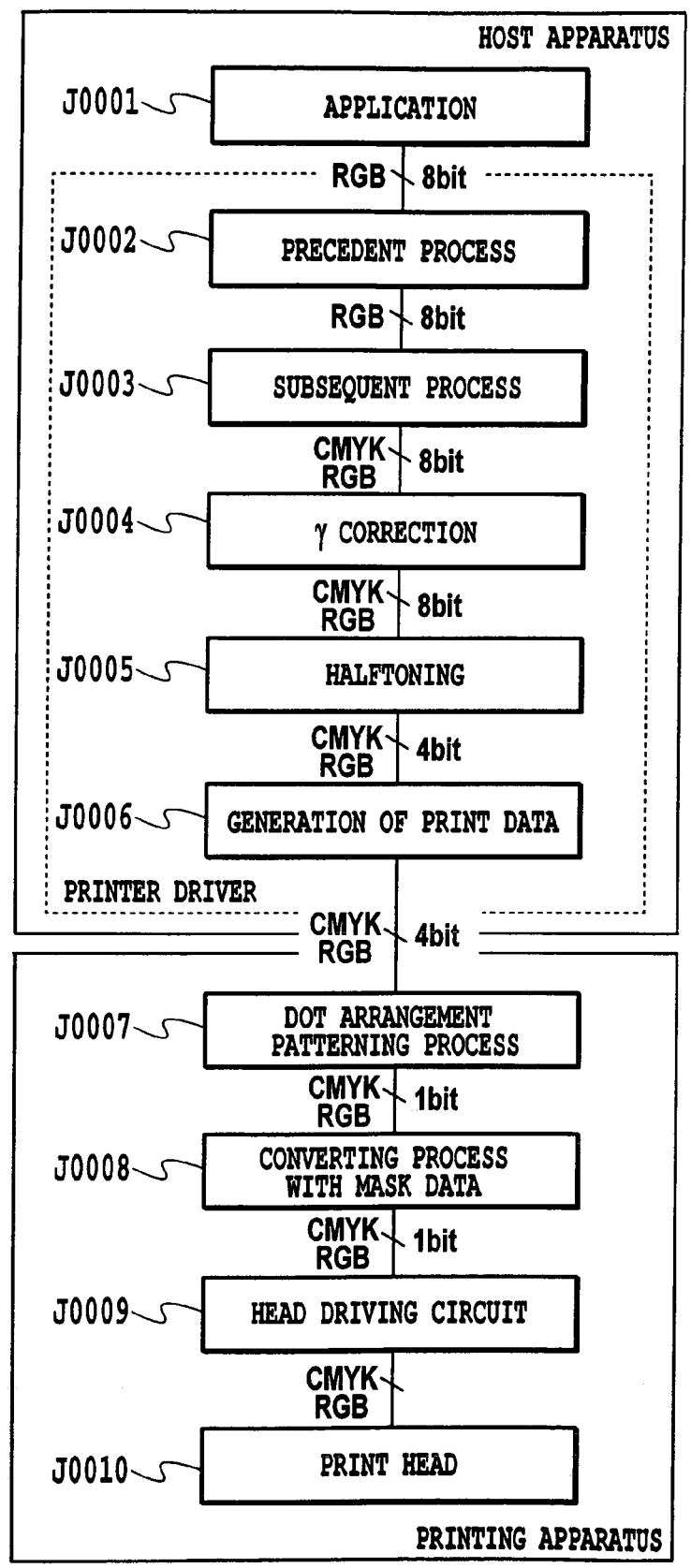
FIG. 23 is a block diagram showing the configuration of a print system according to a first embodiment of the present invention.

FIG. 23 is a block diagram illustrating the flow of an image data converting process according to the present embodiment. The ink jet print apparatus used in the present embodiment carries out printing using not only inks in basic colors, cyan, magenta, yellow, and black but also inks in red, green, and blue. For this purpose, seven print heads are provided each of which eject the corresponding color ink. As shown in FIG. 23, each of the processes shown in the specification is organized by the print apparatus and a personal computer (PC) serving as host apparatus.

An application and a printer driver are programs operating in an operation system of the host apparatus. An application J1001 executes a process of creating image data printed by the print apparatus. For an actual printing operation, image data created by the application is passed to the printer driver.

The printer driver according to the present embodiment has processes including a preprocess J0002, a postprocess J0003, a γ correction process J0004, a halftoning process J0005, and a print data creating process J0006. Each of these processes will be described below in brief. The preprocess J0002 maps gamuts. The preprocess converts the image data R, G and B in the gamut according to the sRGB standards into the data in the gamut which the print apparatus can reproduce. Specifically, a three-dimensional LUT is used to convert data in which R, G, and B are each expressed by 8 bits, into 8-bit data for R, G, and B having different contents.

On the basis of the data R, G, and B subjected to gamut mapping, the postprocess J0003 determines color decomposition data Y, M, C, K, R, G, and B corresponding to a combination of inks reproducing a color expressed by the data. As in the case of the preprocess, the three-dimensional LUT is used to execute an interpolation.

The γ correction process J0004 converts a gray level value for each color data in the color decomposition data determined by the postprocess J0003. Specifically, conversions are carried out so that the color decomposition data is linearly associated with the gray level characteristic of the print apparatus, using a one-dimensional LUT based on the gray level characteristic of each color ink in the print apparatus.

The halftoning process J0005 carries out quantization such that each of the 8-bit color decomposition data Y, M, C, K, R, G, and B is converted into 4-bit data. In the present embodiment, an error diffusion method is used to convert 8-bit data at 256 gray levels into 4-bit data at 9 gray levels. The 4-bit data serves as an index indicating an arrangement pattern for a patterning process for dot arrangement in the print apparatus.

At the end of a process using the printer driver, the print data creating process J0006 creates print data by adding print control information to print image data containing the 4-bit index data.

The print apparatus executes a dot arrangement patterning process J0007 and a mask data converting process J0008 on the input print data.

Description will be given of the dot arrangement patterning process J0007 according to the present embodiment. The above halftoning process reduces the level of data by converting multivalued density information with 256 values (8-bit data) into gray level information with 9 values. However, binary information indicating whether or not to execute printing using ink is the information that can be actually printed by the ink jet print apparatus according to the present embodiment. The dot arrangement patterning process reduces multivalue levels 0 to 8 to a binary level determining whether or not to create dots. The dot arrangement patterning process J0007 assigns, to each pixel expressed by 4-bit data at the levels 0 to 8, a dot arrangement pattern corresponding to the gray level value (levels 0 to 8) of that pixel, the 4-bit data being an output value from the halftoning section. The dot arrangement patterning process thus defines turn-on or -off of a dot in each of plural areas in one pixel to place 1-bit ejection data of "1" or "0" in each area in one pixel.

Figure 24:
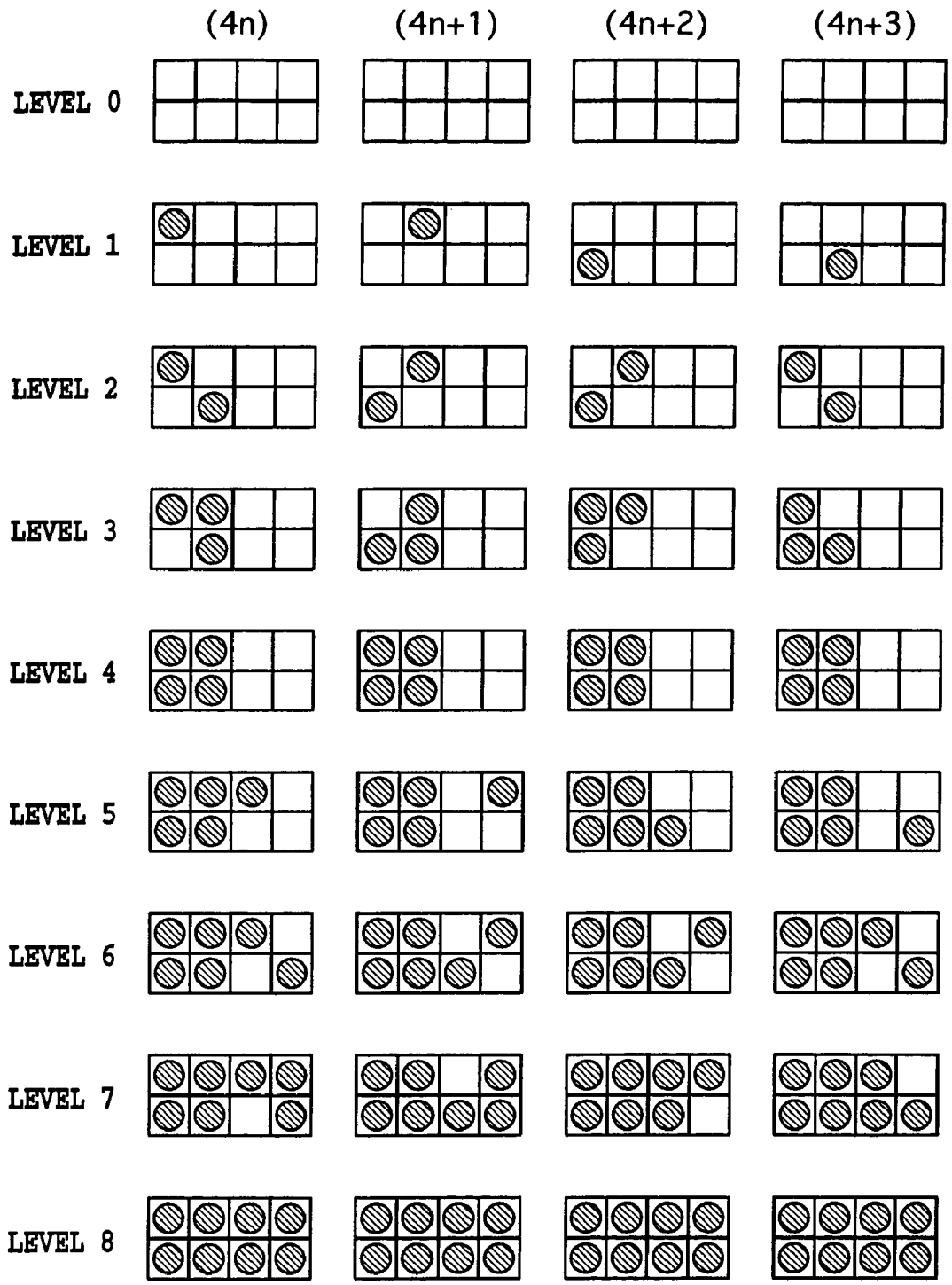
FIG. 24 is a diagram showing output patterns obtained by converting an input level by a dot arrangement patterning process according to the embodiment of the present invention.

FIG. 24 shows output patterns corresponding to input levels 0 to 8 and which are converted by the dot arrangement patterning process in a high image quality mode according to the present embodiment. The level values shown in the left of the figure correspond to the levels 0 to 8, which are output values from the halftoning section. Each of the 2×4 areas arranged in the right of the figure corresponds to the area of one pixel output by the halftoning process. Both the length and breadth of each 2×4 area correspond to a printing density of 600 ppi (pixel/inch). Further, each area in one pixel corresponds to the minimum unit for which the turn-on or -off of a dot is defined. The area corresponds to a density of 1,200 dpi (dot/inch) in length and a density of 2,400 dpi in breadth. The print apparatus according to the present embodiment provides 2 pl of ink droplet for one area expressed using a length of 20 μm and a breadth of 10 μm, corresponding to the above printing density, to obtain the desired density.

Further, in the vertical direction of FIG. 24, the ejection openings in the print head are arranged, both area arrangement density and ejection opening arrangement density have a value of 1,200 dpi. The horizontal direction of FIG. 24 corresponds to the print head scanning direction. In the high image quality mode of the present embodiment, the print head carries out printing at a density of 2,400 dpi.

Moreover, in the figure, dots are printed in areas with circles. The number of dots printed increases consistently with the level value.

In FIG. 24, (4*n*) to (4*n*+3) each indicate a pixel position in the horizontal direction with respect to the left end of the input image when an integer of at least 1 is substituted into n. The patterns shown below (4*n*) to (4*n*+3) indicate that different patterns are provided even for the same input level depending on the pixel positions. That is, even if the same level is input, four types of dot arrangement patterns shown below (4*n*) to (4*n*+3) are circularly assigned on the print medium. This configuration is effective for varying the number of ejections between printing elements located at the upper level of the dot arrangement pattern and printing elements located at the lower level of the dot arrangement pattern. The configuration is also effective for distributing various noises intrinsic to the print apparatus.

In the present embodiment, the density information on the original image is finally reflected in the above manner. Once the dot arrangement patterning process is finished, all the dot arrangement patterns are determined for print medium.

The mask data converting process J0008 will be described below.

Figure 5:
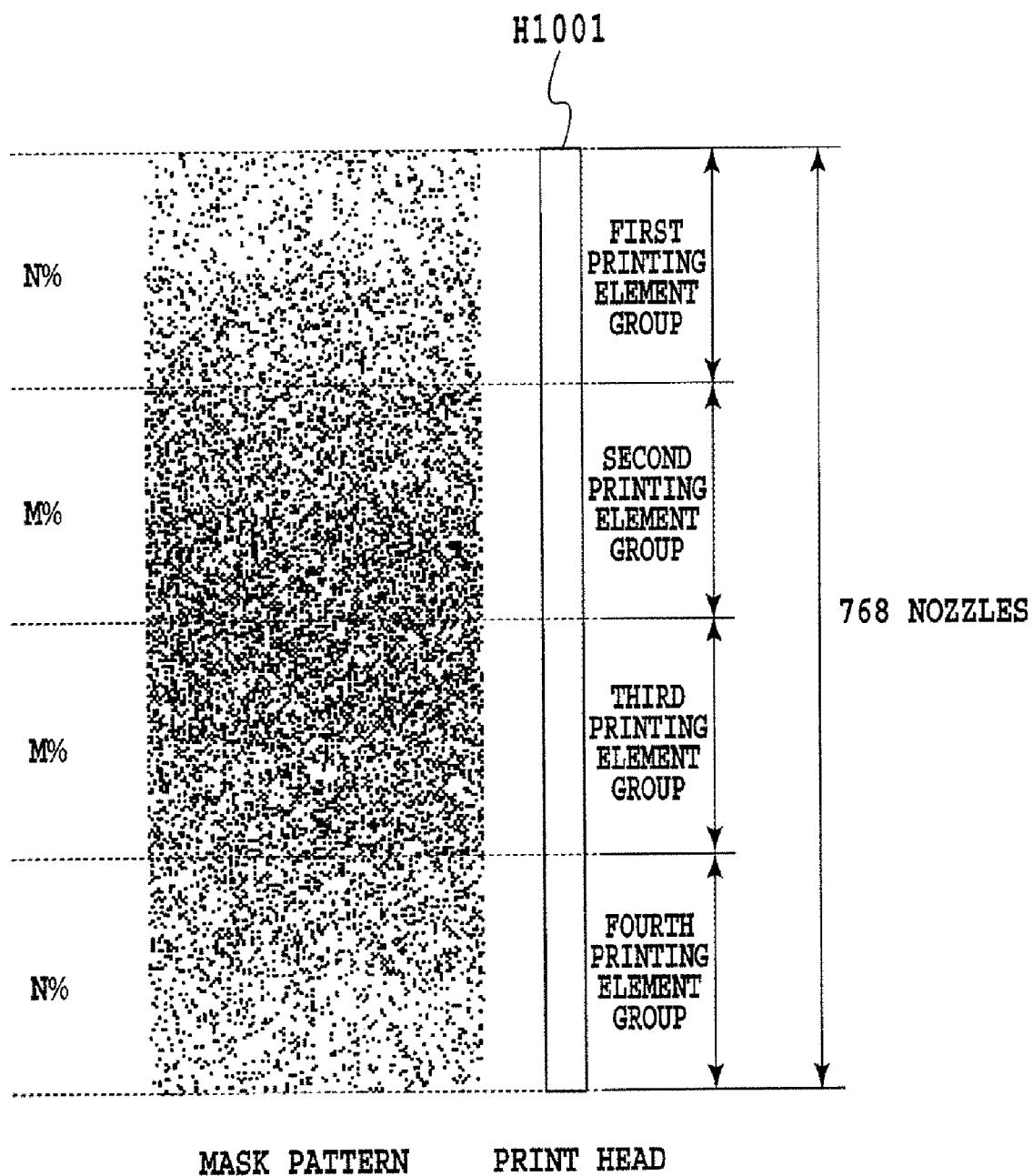
FIG. 5 is a diagram showing an example of mask patterns employed to make end-deviations unmarked.

The above dot arrangement patterning process has determined whether or not to provide a dot for each area on the print medium. The desired image can be printed by inputting this information to the print head driving circuit as it is. However, as already described in the background art section, ink jet print apparatuses commonly adopt multi-pass printing in order to improve image quality. In the present embodiment, the mask patterns described in the background art section and shown in FIG. 5 are used. The mask data is stored in the memory in the print apparatus main body. In the mask data converting process, an AND process is executed on the mask data and an output signal resulting from the dot arrangement patterning process. This determines print pixels to which ink is actually ejected during each printing scan. Subsequently, the print image data is input to the driving circuit J0009 for the print head H1001 as an output signal.

In the present embodiment, the different mask patterns are used depending on the print position on the print medium (middle portion or end) as described below. Specifically, a first and second mask patterns are provided; the first mask pattern is used to print the middle portion of the print medium, and the second mask pattern is used to print the end of the print medium (at least the leading end portion or the trailing end portion). Accordingly, the first and second mask patterns are stored in the memory.

(Printing at Leading and Trailing End Portions of Print Medium)

Figure 1:
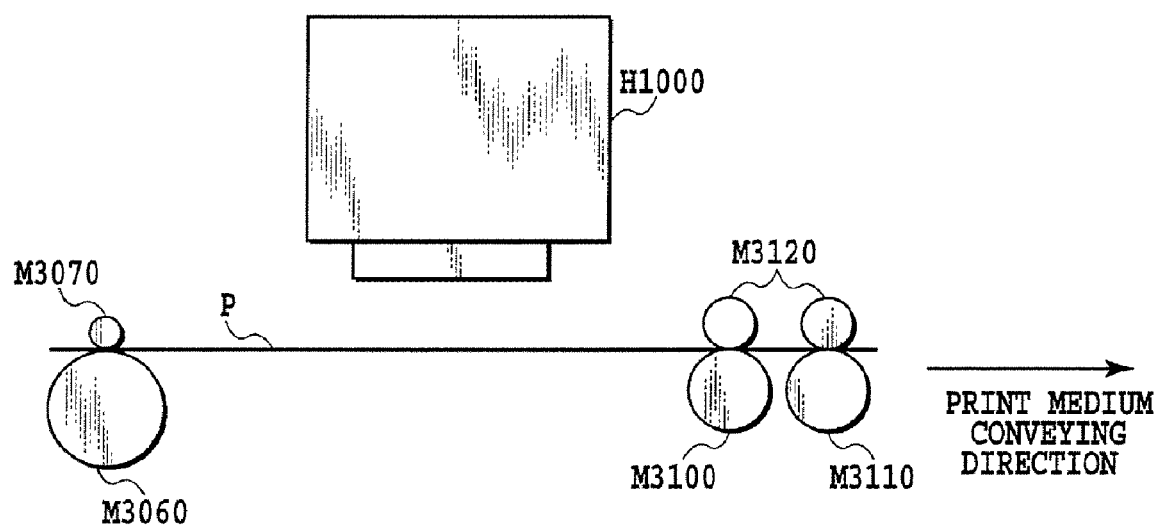
FIG. 1 is a diagram schematically showing that the middle portion of a print medium is being printed in a conveying mechanism that conveys the print medium while supporting it.
Figure 2:
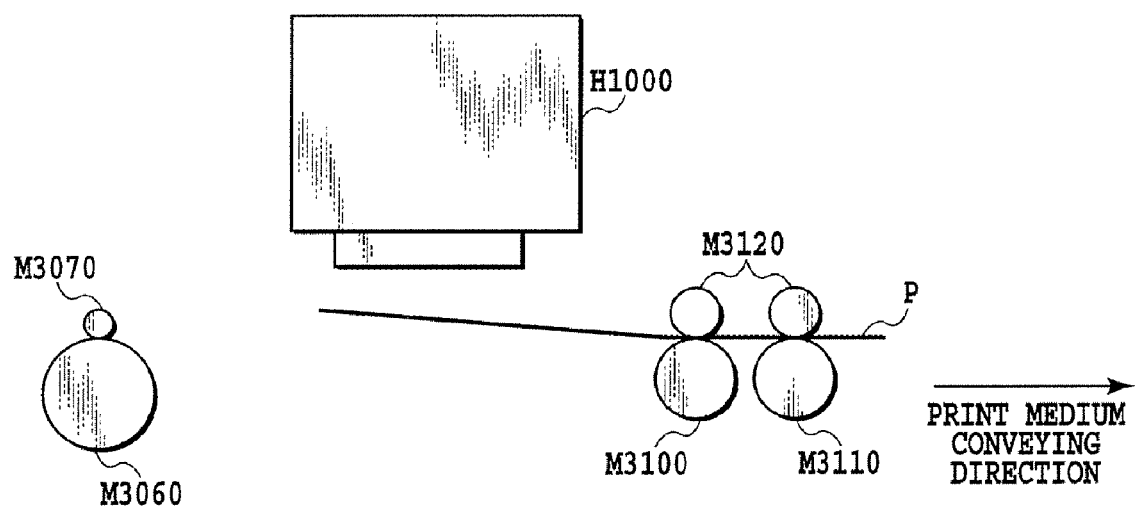
FIG. 2 is a diagram showing that the vicinity of the trailing end portion of the print medium is being printed in a conveying mechanism that conveys the print medium while supporting it.
Figure 3:
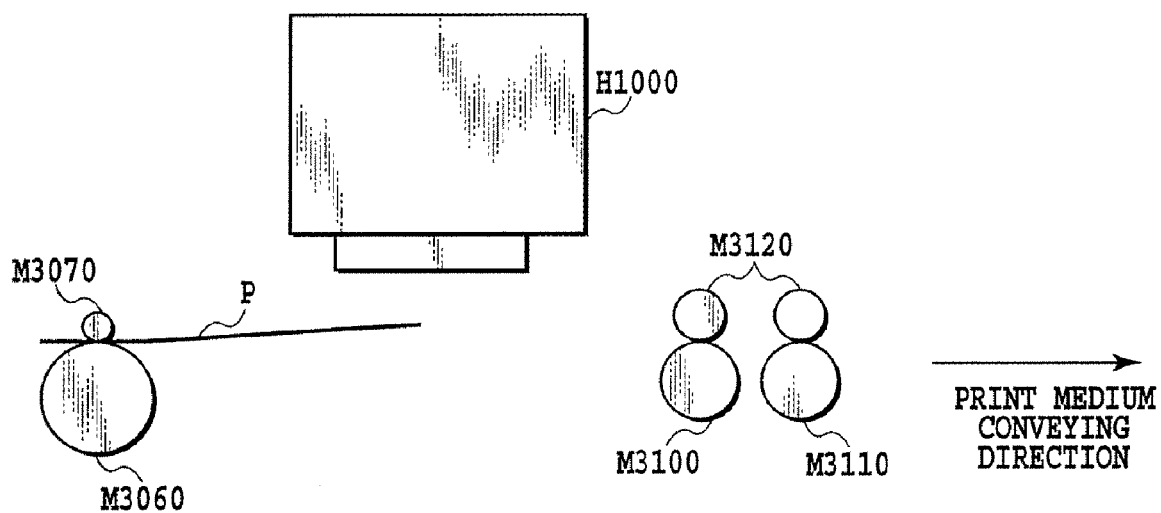
FIG. 3 is a diagram showing that the vicinity of the leading end portion of the print medium is being printed in a conveying mechanism that conveys the print medium while supporting it.
Figure 6:
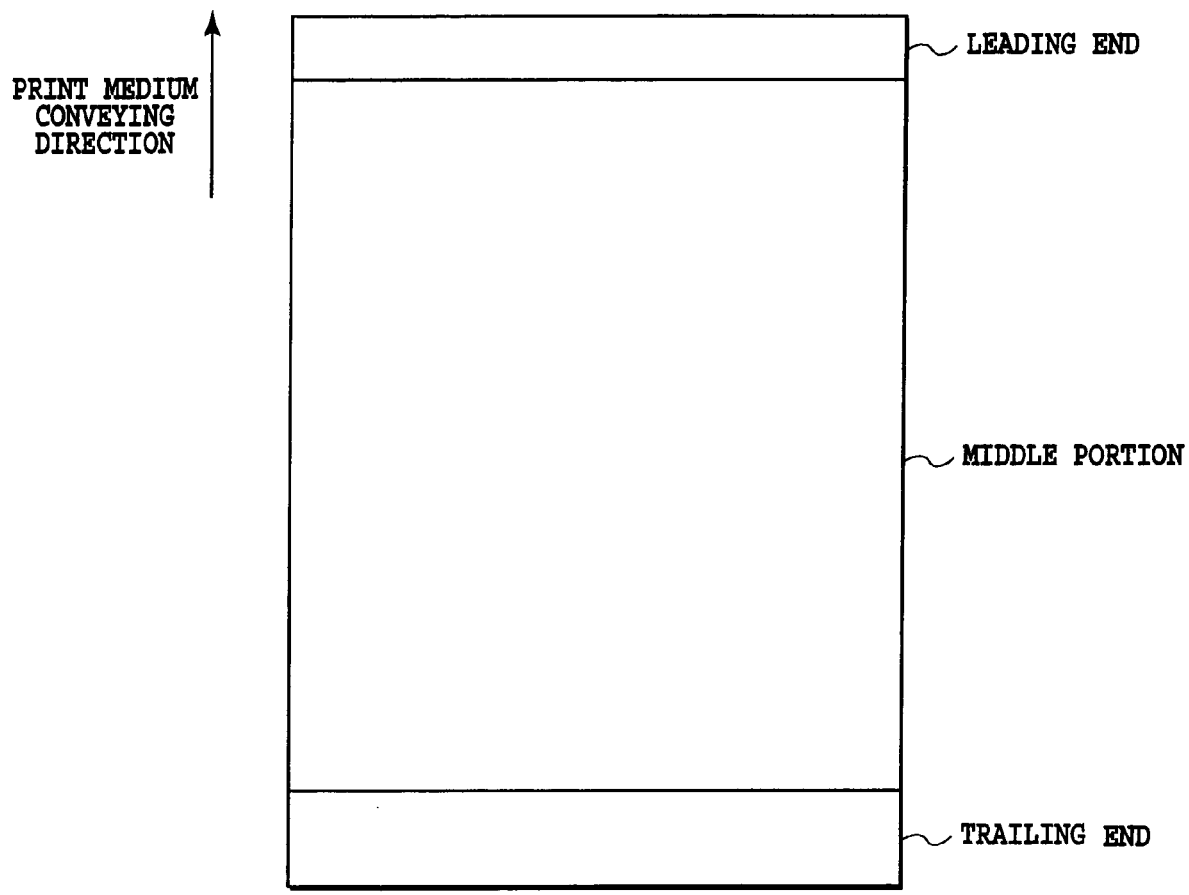
FIG. 6 is a diagram showing a leading, middle portion, and trailing areas of the print medium.

FIG. 6 is a diagram showing a leading, middle portion, and trailing area of an A4-sized print medium to be printed by the print apparatus according to the present embodiment. That is, as shown in FIGS. 1 to 3, an area of the print medium printed before the leading end portion of the print medium is supported by the sheet discharging roller M3100 is the leading portion. An area of the print medium printed after the trailing end portion of the print medium departs from the conveying roller M3060 is the trailing portion. The entire area of the print medium except the leading and trailing portions is the middle portion. The middle portion is an area printed with the print medium held by both the conveying roller M3060 and sheet discharging roller M3100.

For description, three types of conveyance states will be defined. In a first conveying operation, the print medium is supported by the conveying roller but not by the sheet discharging roller. In a second conveying operation, the print medium is supported by both the conveying roller and the sheet discharging roller. In a third conveying operation, the print medium is not supported by the conveying roller but by the sheet discharging roller. Strictly speaking with the conveying operations defined as described above, the print area can be divided into five areas. In an area A, an image is completed using only the first conveying operation. In an area B, an image is completed using the first and second conveying operations. In an area C, an image is completed using only the second conveying operation. In an area D, an image is completed using the second and third conveying operations. In an area E, an image is completed using only the third conveying operation. In the embodiment described below, the areas A and B correspond to the leading portion. The area C corresponds to the middle portion. The areas D and E correspond to the trailing portion. Thus, the two types of mask patterns prepared are applied to these areas.

In the present embodiment, the leading and trailing portions are printed using those of the printing elements arranged in the printing element row which are located more downstream (closer to the sheet discharging roller). Consequently, the area treated as the trailing portion is slightly wider than that treated as the leading portion.

(Relationship Between Mask Pattern Printing Rate and Image Grade)

Description will be given of the examinations made by the inventors.

Figure 7:
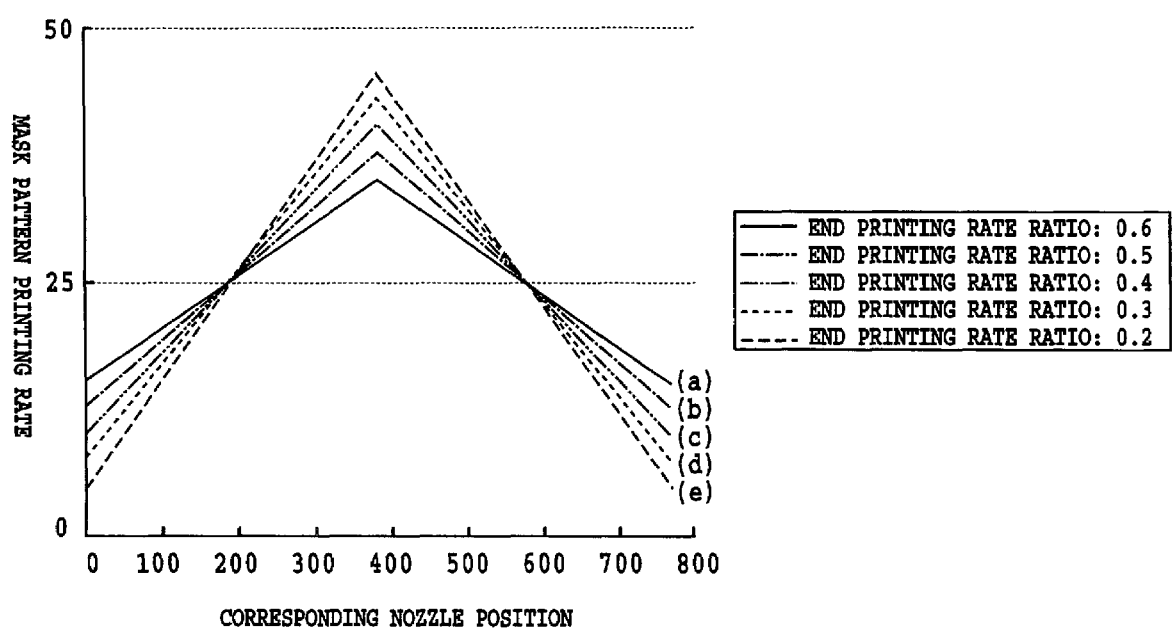
FIG. 7 is a graph showing the printing rates of a plurality of mask patterns.

FIG. 7 is a graph showing the printing rates of a plurality of mask patterns produced by the inventors. In the figure, the axis of abscissa indicates the position of each of the 768 printing elements arranged on the print head. The axis of ordinate indicates the printing rate of each printing element. The inventors produced five types of mask patterns a to e in order to make the present examinations. In the present examinations, the mask patterns are applicable to 4-pass printing, so that the average printing rates of curves a to e are all 25%. Here, the average printing rate is represented as 100/K when reference numeral K denotes the number of passes required completing the same area.

The printing rate of the mask pattern is the percentage for which the number of printing permitted areas accounts in the total number of printing permitted areas (black areas in FIG. 5) and printing non-permitted areas (white areas in FIG. 5) constituting the mask pattern. This will be specifically described below. For example, the horizontal (the direction orthogonal to the direction in which the printing elements are arranged) size of the mask pattern in FIG. 5 is assumed to correspond to 768 areas. In this case, the total number of printing permitted area and printing non-permitted areas is 768. If of the 768 areas, 192 are printing permitted areas and 576 are printing non-permitted areas, the printing rate of the mask pattern corresponding to this printing element is 25% (=192/768×100).

For all the curves a to e in FIG. 7, the distribution of the printing rate is such that the middle portion of the curve is high, whereas the ends of the curve are low. The curve a has smallest difference between the middle portion printing rate and the end printing rate. For curve a, the printing rate of the middle portion is 35%, whereas the printing rate of the opposite ends is 15%. The rate for which the printing rate of the ends accounts in the average printing rate of 25% is 15/25=0.6. Subsequently, the rate for which the end printing rate accounts in the average printing rate of 25% will subsequently referred to as end printing rate ratio.

Curve e has the largest difference between the middle portion printing rate and the end printing rate. For curve e, the middle portion printing rate is 45%, while the end printing rate is 5%. The rate for which the end printing rate accounts in the average printing rate of 25% is 5/25=0.2. Curves b to d shows the printing rate of the mask pattern characterized in that curves b to d are obtained by internally dividing the space between curves a and e.

FIG. 8 is a table showing the end printing rate, middle portion printing rate, and end printing rate ratio for the masks a to e, shown in FIG. 7.

Figure 9A:
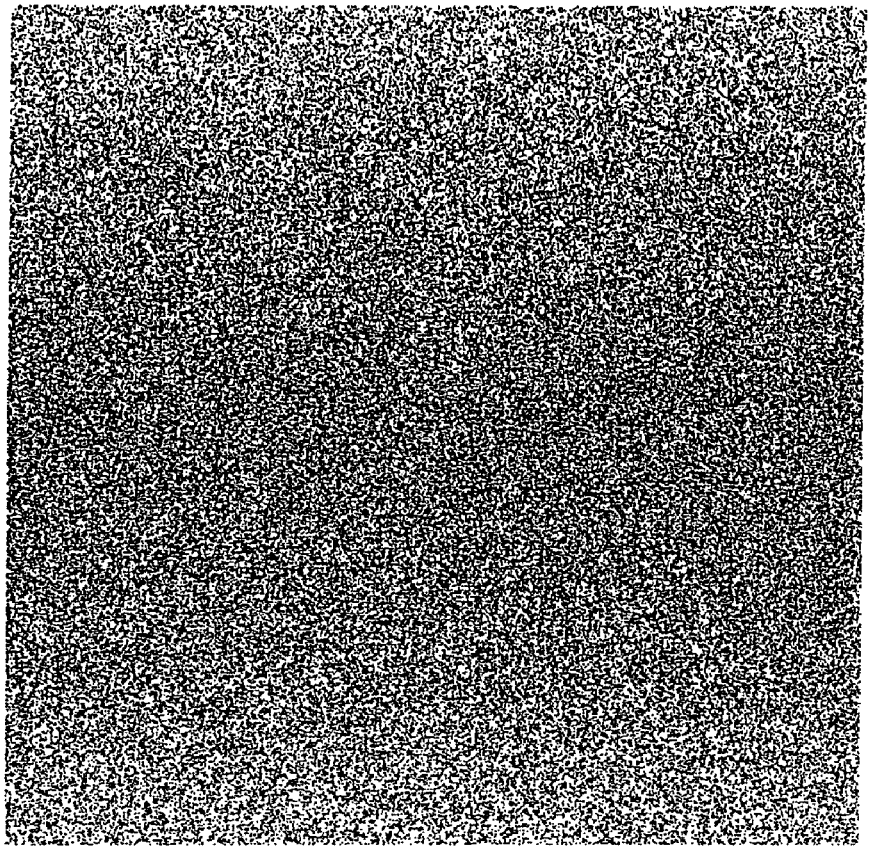
Figure 9B:
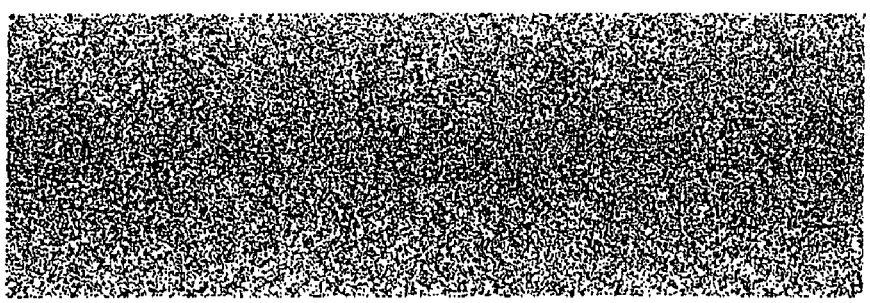

FIG. 9A shows an example of the mask pattern of curve a shown in FIG. 7. In the figure, the axis of ordinate corresponds to the direction in which the 768 printing elements are arranged. The printing rate of middle portion printing elements is 35%. The printing rate of the terminal printing elements is 15%. FIG. 9B shows a mask pattern used for printing with 256 printing elements even though the end printing rate ratio is similar to that in FIG. 9A. Also in this figure, the printing rate of middle portion printing elements is 35%. The printing rate of the terminal printing elements is 15%.

Figure 10A:
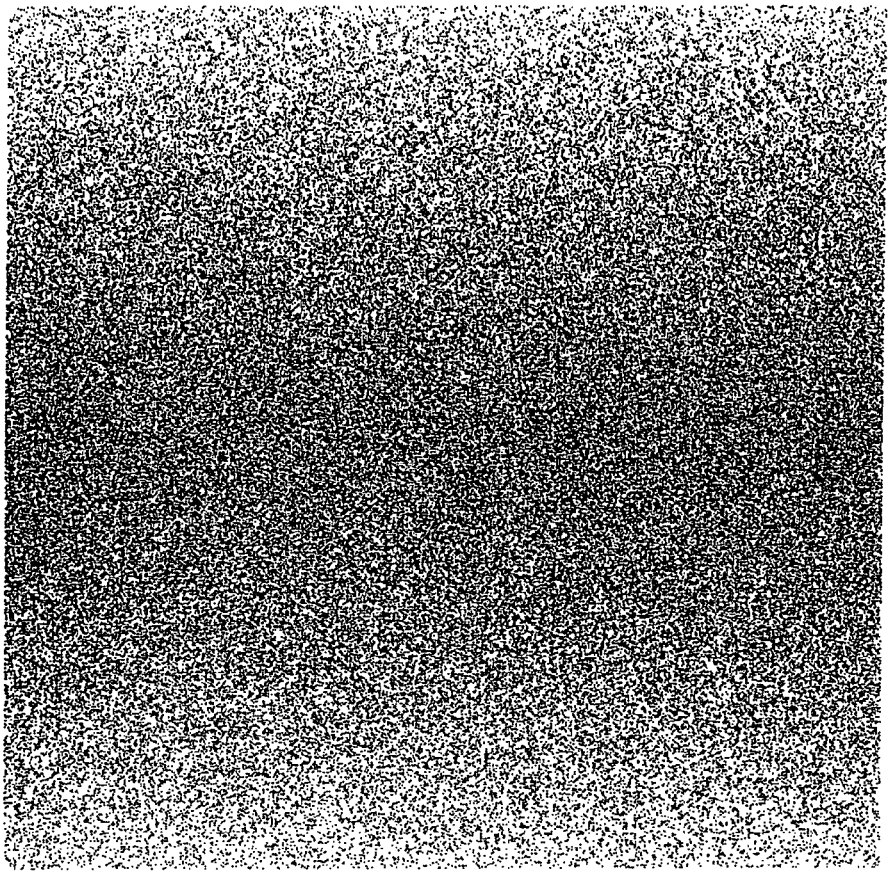
FIGS. 10A and 10B are diagrams showing an example of the mask pattern shown by d.
Figure 10B:
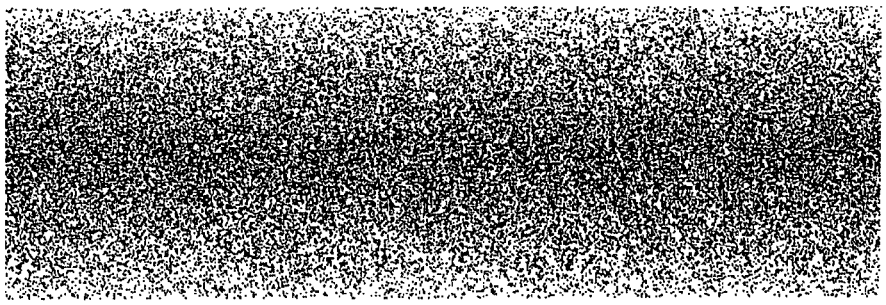

FIG. 10A shows an example of the mask pattern of curve d shown in FIG. 7. In the figure, the axis of ordinate corresponds to the direction in which the 768 printing elements are arranged. The printing rate of middle portion printing elements is 42.5%. The printing rate of the terminal printing elements is 7.5%. FIG. 10B shows a mask pattern used for printing with 256 printing elements even though the end printing rate ratio is similar to that in FIG. 9A. Also in this figure, the printing rate of middle portion printing elements is 42.5%. The printing rate of the terminal printing elements is 7.5%. The mask patterns in both FIGS. 10A and 10B show a higher middle portion printing rate and a lower end printing rate than those shown in FIGS. 9A and 9B.

The inventors used mask patterns for 256 printing elements such as the ones shown in FIGS. 9B and 10B to check resulting images for disturbance resulting from a variation in conveyance amount. A specific check method will be described below.

In the print apparatus according to the present embodiment, the printing elements are arranged on the print head at 1,200 dpi. Accordingly, if consecutive 256 printing elements are used for 4-pass printing, the conveyance amount between printing scans is:

25.4 (mm/inch)/1200×256/4≈1.2547(mm).

Plural types of patterns were printed while increasing or reducing the conveyance amount at 1 μm increments with respect to the above value; the above mask patterns were used so that gray or another hue would be uniform. Subsequently, output images were visually checked to evaluate the images for black stripes that may occur if the conveyance amount is excessively small and white stripes that may occur if the conveyance amount is excessively large.

Figure 11:
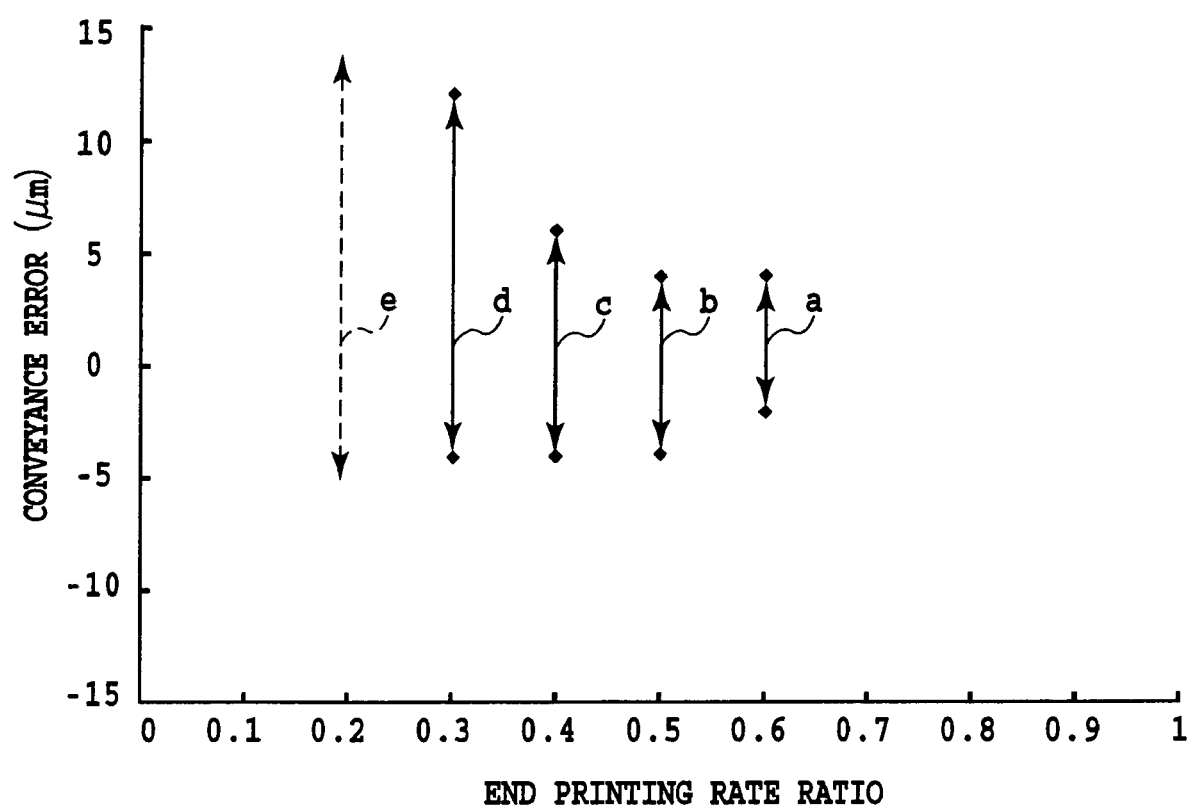
FIG. 11 is a diagram illustrating the results of visual evaluations.

FIG. 11 is a diagram illustrating the results of the visual evaluations. In the figure, the axis of abscissa indicates the end printing rate ratio of the mask pattern. The axis of ordinate indicates conveyance errors (deviation amount) with respect to the regular conveyance amount. Five arrows correspond to the five types of mask patterns a to e produced and indicate the allowable ranges of conveyance error amounts. The figure shows that the mask pattern a with an end printing rate ratio of 0.6 allows an error of only about ±3 μm from the regular conveyance amount. In contrast, the mask pattern d with an end printing rate ratio of 0.3 allows an error of about −4 to +12 μm from the regular conveyance amount. For the mask pattern e with an end printing rate ratio of 0.2, no marked white or black stripes were observed over the entire error range checked. Accordingly, a dashed arrow indicates the checked range.

The above results indicate that more leftward ones of the evaluated mask patterns, that is, those with lower end printing rate ratios, involve more unmarked white and black stripes. White or black stripes attributed to a variation in conveyance amount tend to appear in the intervals between printing scans, that is, at the ends of print areas. Accordingly, by reducing the printing rate of an area most likely to be adversely affected to make the presence of black or white stripes unmarked and setting the printing rate higher of the printing element group covering this portion for another printing scan, it is possible to make white or black stripes in the intervals insignificant. Description will be given below of the relationship between the end printing rate ratio (mask pattern gradient) and the adverse effect on the image on the basis of the results of the inventors' verifications.

Figure 27A:
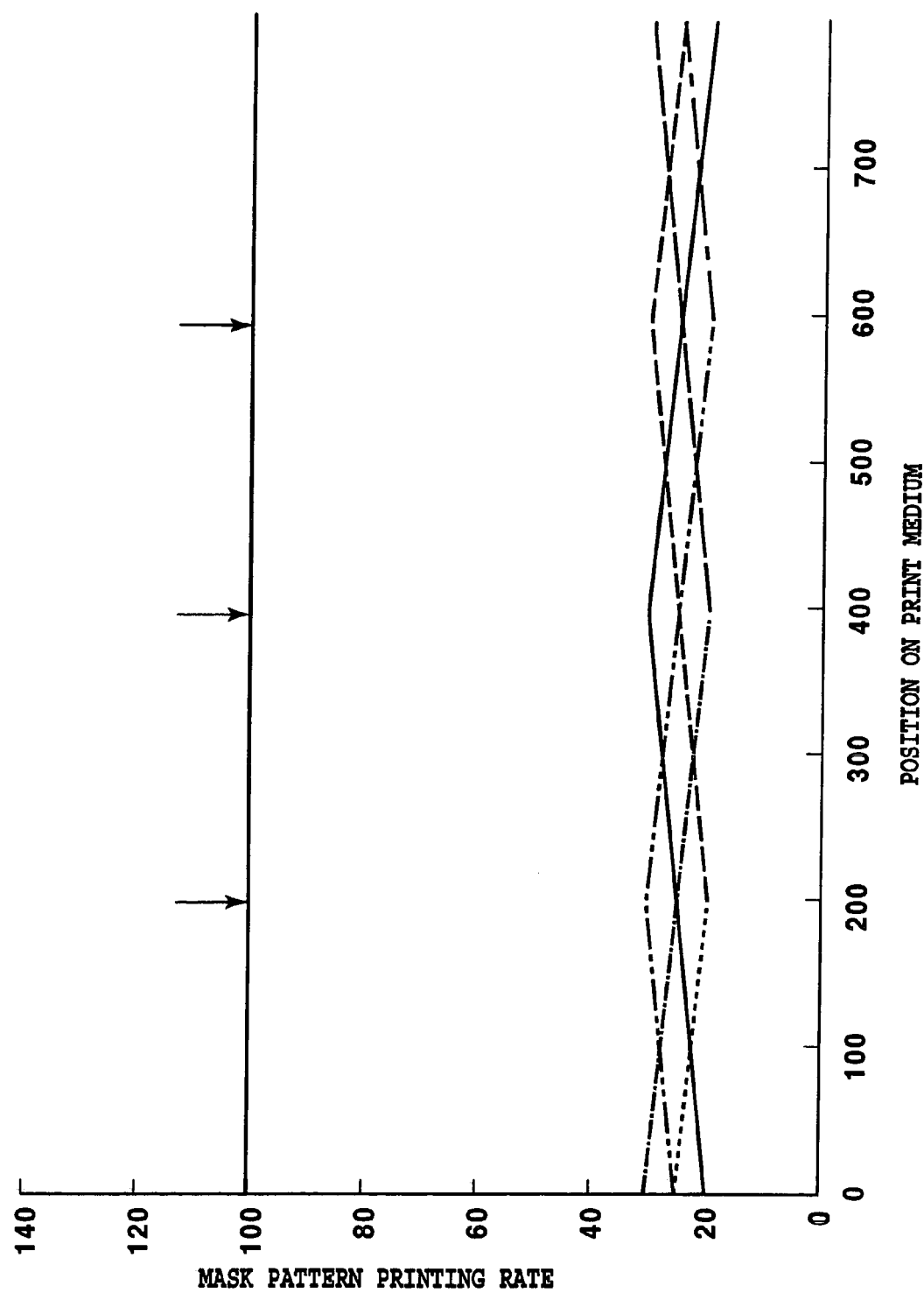
FIGS. 27A to 27C are diagrams illustrating the adverse effect of the end printing rate ratio on the image grade.
Figure 27B:
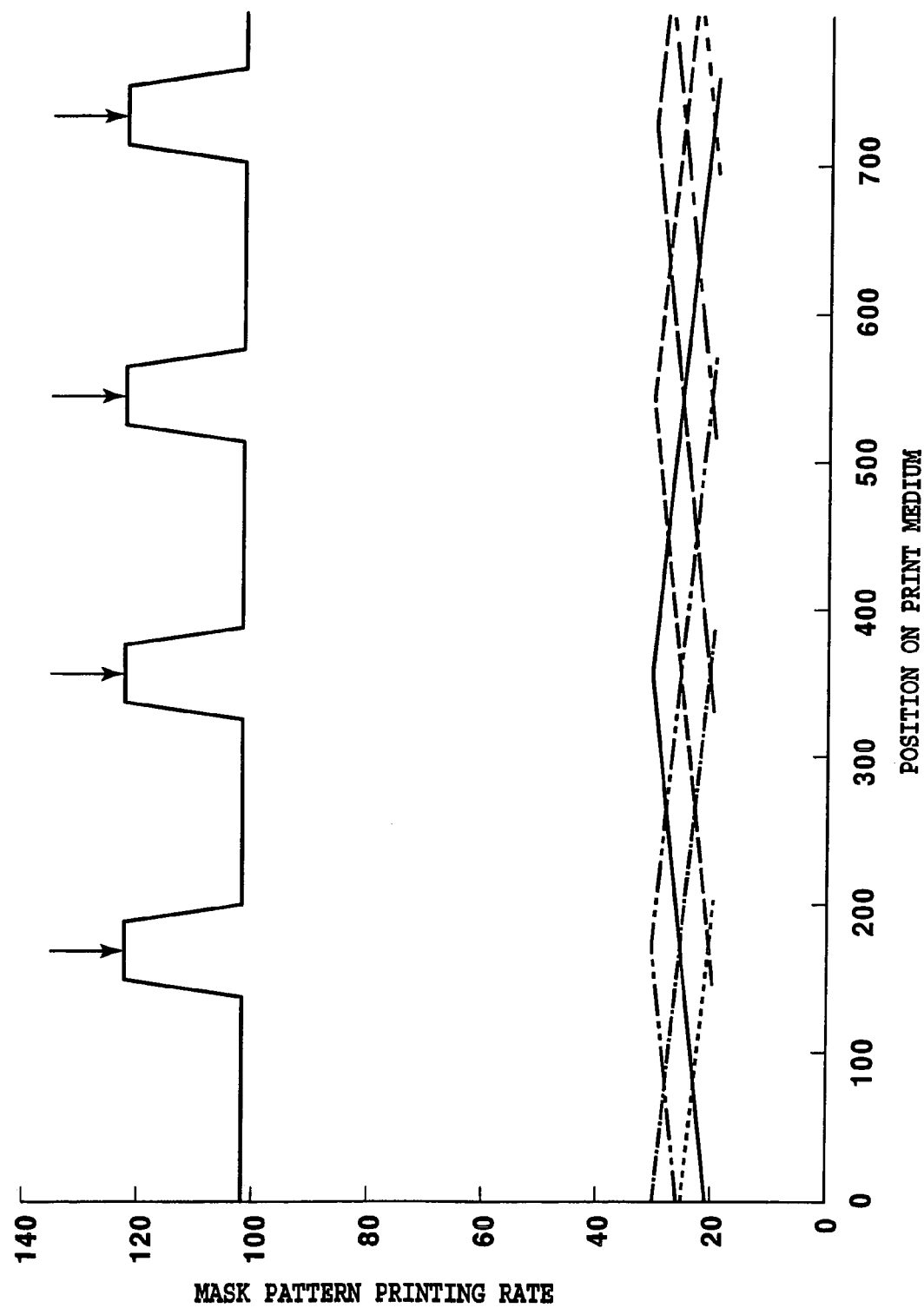
Figure 27C:
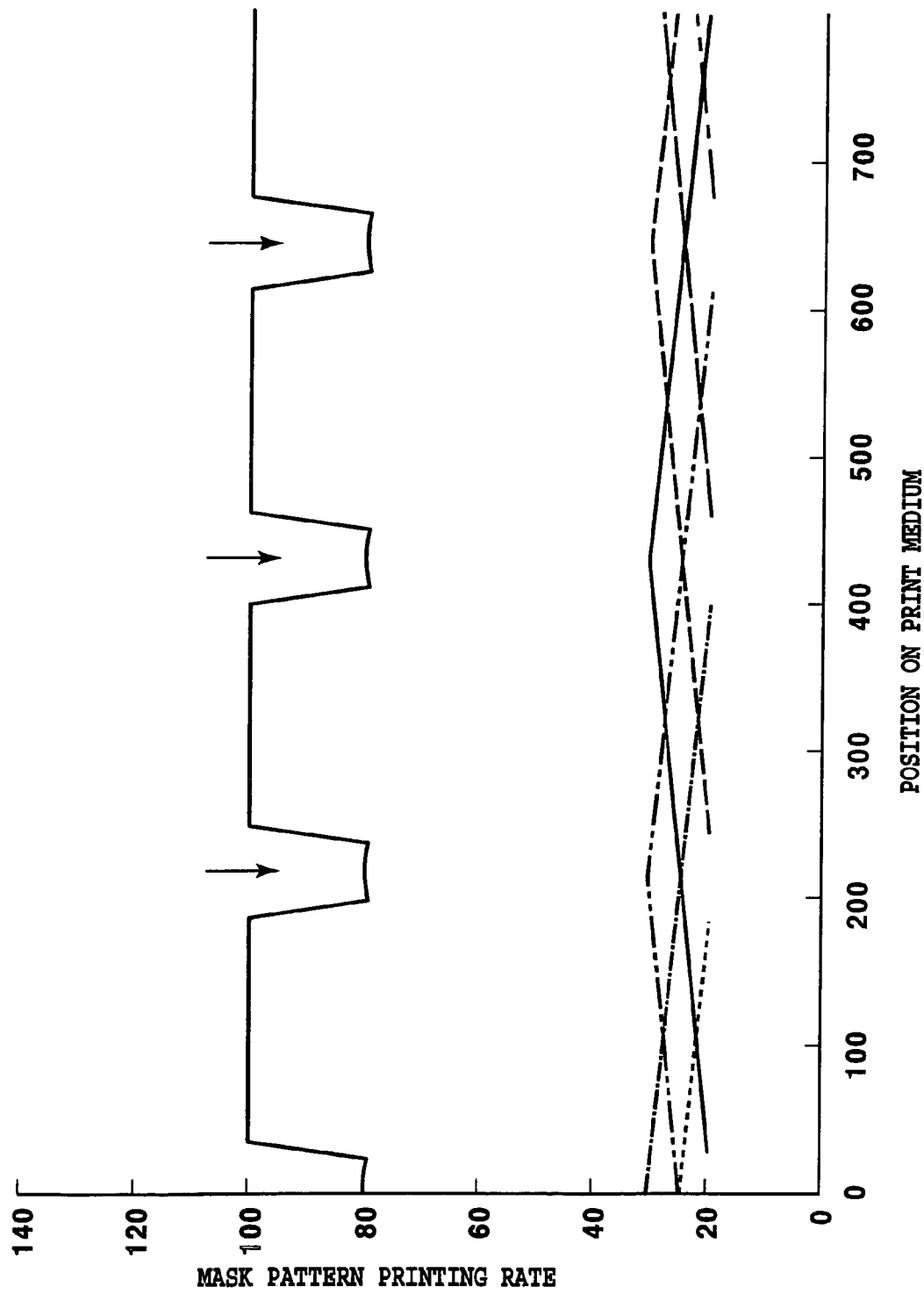

FIGS. 27A to 27C show how black or white strips occur if a 4-pass pattern with a relatively small gradation gradient, that is, a high end printing rate ratio, is used and if the conveyance amount is increased above or reduced below the regular amount. FIG. 27A shows that the conveyance amount is equal to the regular one. In this case, since the conveyance amount is equal to the regular one, no black or white stripes appear on the image. In contrast, FIG. 27B shows that the conveyance amount is smaller than the regular one. In this case, areas with higher densities than the other areas, that is, black stripes, are observed in the intervals shown by arrows. Moreover, FIG. 27C shows that the conveyance amount is smaller than the regular one. In this case, areas with lower densities than the other areas, that is, white stripes, are observed in the intervals shown by arrows.

Figure 26B:
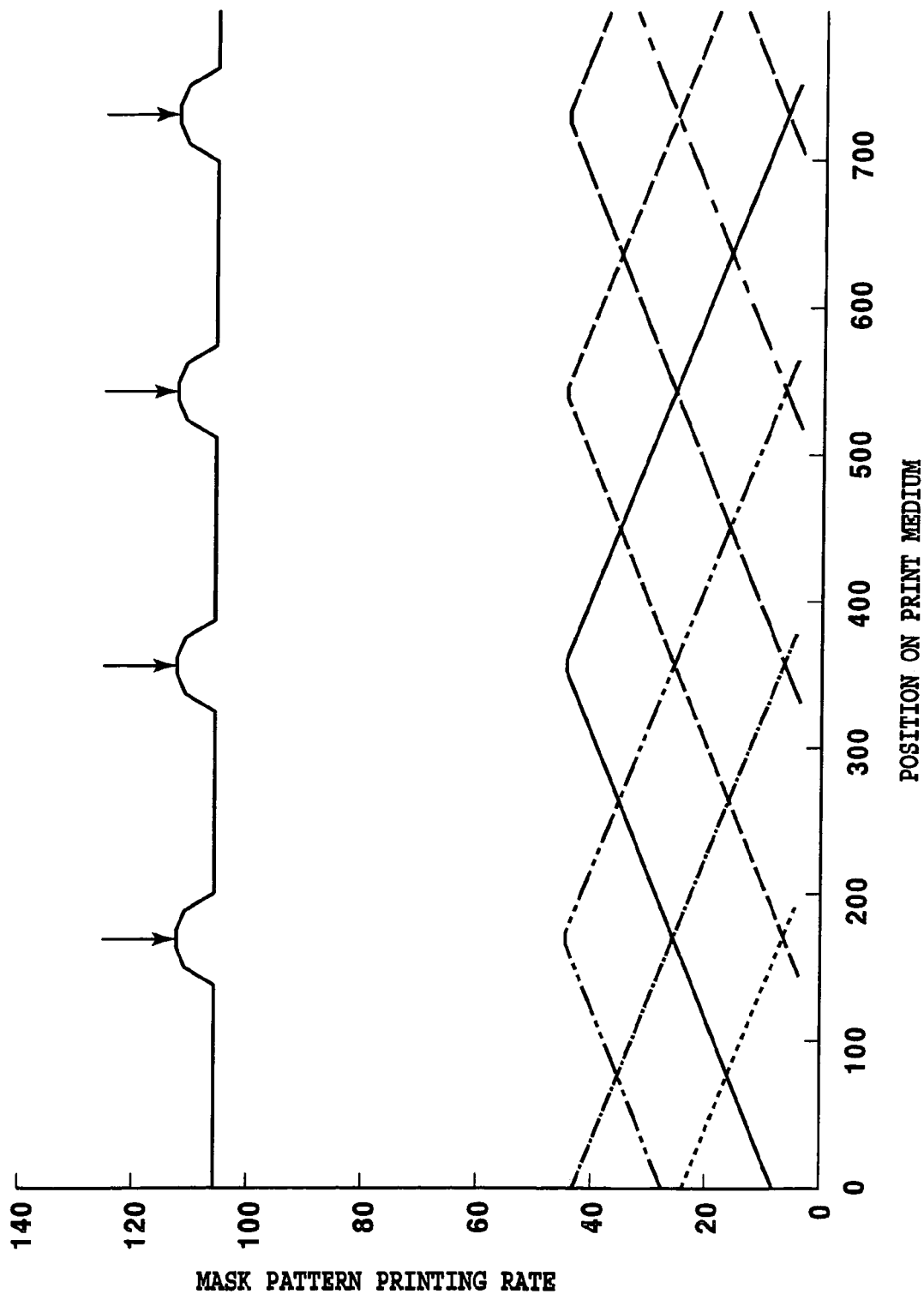
Figure 26C:
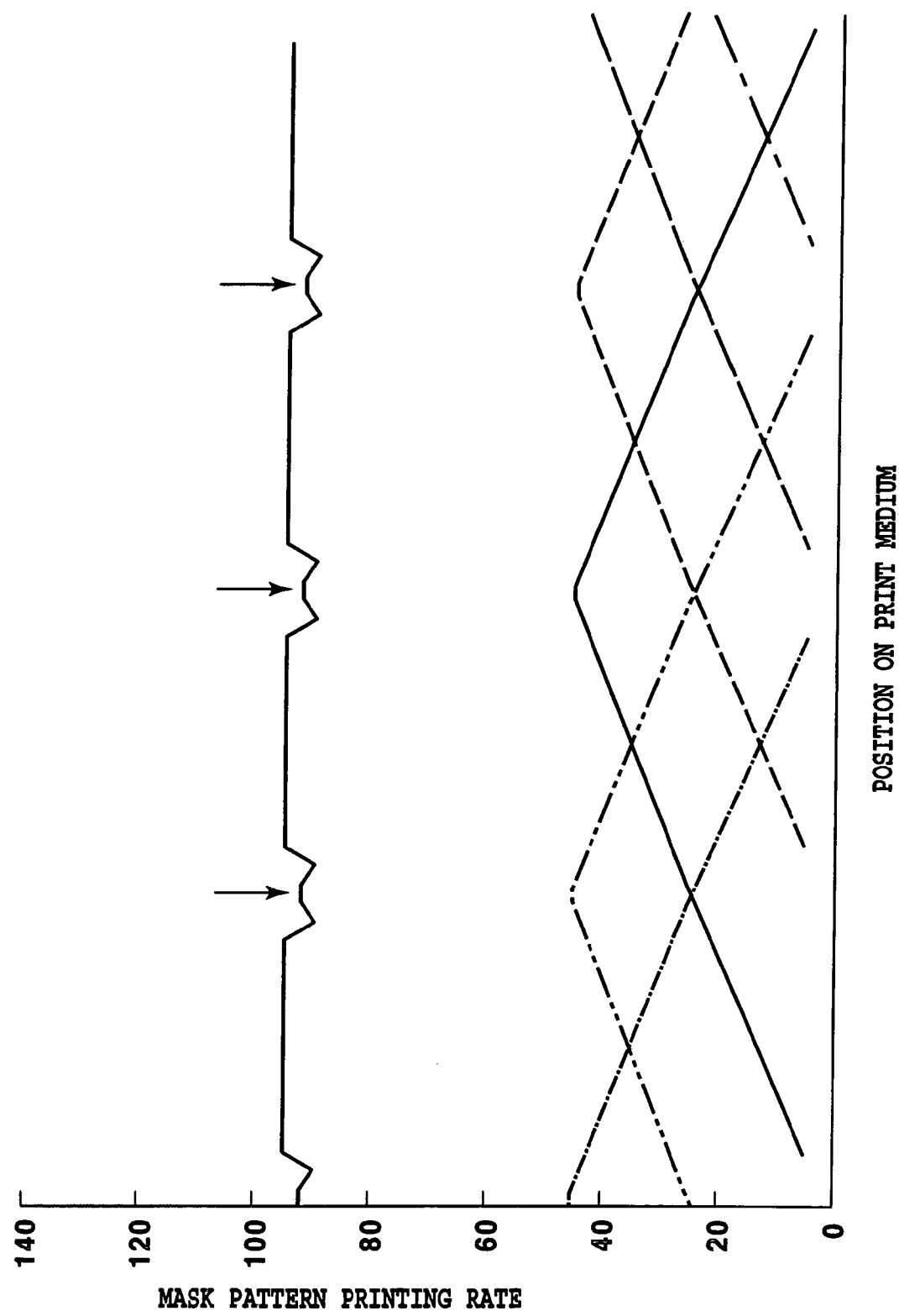

On the other hand, FIGS. 26A to 26C show how black or white strips occur if a 4-pass pattern with a relatively large gradation gradient, that is, a low end printing rate ratio, is used. FIG. 26A shows that the conveyance amount is equal to the regular one. In this case, as in the case of FIG. 27A, no black or white stripes appear on the image. In contrast, FIG. 26B shows that the conveyance amount is larger than the regular one. In this case, black stripes are observed for the same reason as that in FIG. 27B but are more unmarked. Moreover, FIG. 26C shows that the conveyance amount is larger than the regular one. Also in this case, white stripes are made more insignificant than those in FIG. 27C.

The above examination results indicate that mask patterns with smaller end printing rate ratios make black or white stripes unmarked, the stripes possibly resulting from conveyance errors. However, on the other hand, in the actually observed images, mask patterns with lower end printing rate ratios more often involve a dense area in the middle portion of the print area during a single printing scan; the middle portion has a high mask pattern printing rate. More specifically, this band-shaped uneven-density area was not observed for the mask pattern a with a high end printing rate ratio. However, for the mask pattern b, the uneven density area was dimly observed, and was more clearly perceived as the end printing rate ratio decreased in the order of c, d, and e.

Although a definite mechanism cannot be identified, the inventors have found that if the printing rate is excessively biased within the series of printing element rows, ejection performance may vary in association with a difference in temperature distribution or ejection frequency. Further, a variation in the density of ink droplets impacting the print medium during a printing scan is expected to vary the frequency with which ink droplets are connected together on the print medium before permeation and fixation. This may cause the dense area to appear.

With such a gradation mask as disclosed in Japanese Patent Application Laid-Open No. 2002-096455, the printing elements of the end of the print head can be prevented from being rumpled to make end-deviations insignificant by keeping the distribution of the printing rate in the form of a smooth curve. However, with an excessively great variation in printing rate as in the mask pattern e, the above effect may not be sufficiently produced. Moreover, the plurality of printing elements in the ink jet printing print head preferably have as uniform a printing rate as possible in terms of lifetime.

On the basis of the above examination results, the inventors have acquired the following knowledge. A mask pattern with a lower end recording rate ratio (larger gradient) can advantageously be used to make insignificant white or black stripes resulting from conveyance errors. On the other hand, if the white or black stripes are unmarked, a mask pattern with a higher end printing rate ratio (smaller gradient) can advantageously be used.

Thus, focusing on conveyance errors causing white or black stripes, the inventors used different mask patterns for the case where conveyance errors are likely to occur and for the case where conveyance errors are unlikely to occur. Specifically, a mask pattern with a lower end printing rate ratio was used to print the leading or trailing portion of the print medium, where conveyance errors are likely to occur. In contrast, a mask pattern with a higher end printing rate ratio was used to print the middle portion of the print medium, where conveyance errors are unlikely to occur.

(Configuration of Mask Pattern)

On the basis of the above examination results, in the first embodiment of the present invention, 256 printing elements and the mask pattern shown by d are used to print the leading and trailing portions of the print medium. Further, all the 768 printing elements and the mask pattern shown by a are used to print the middle portion of the print medium, which is different from the leading and trailing portions. This will be described with reference to FIGS. 25A to 25C.

Figure 25A:
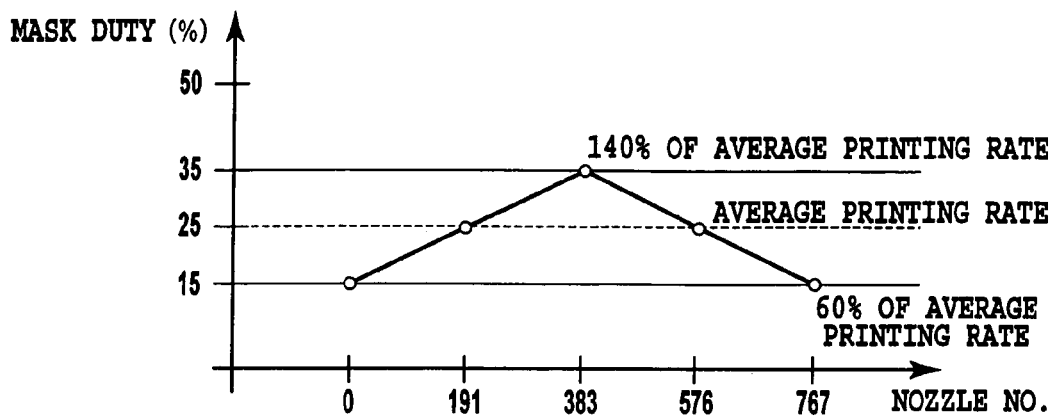
FIGS. 25A to 25C are diagrams showing the distribution of printing rate of the mask patterns used in the embodiment of the present invention as well as comparative examples.

FIG. 25A is a diagram showing the distribution of the printing rate of the mask pattern used for the middle portion of the print medium. In this case, 4-pass printing is carried out and the mask pattern shown by curve a in FIG. 7 is used. That is, of the 768 printing elements, those located at the terminal have a printing rate of 15%, and those located in the middle portion have a printing rate of 35%. The end printing rate ratio is 0.6.

Figure 25B:
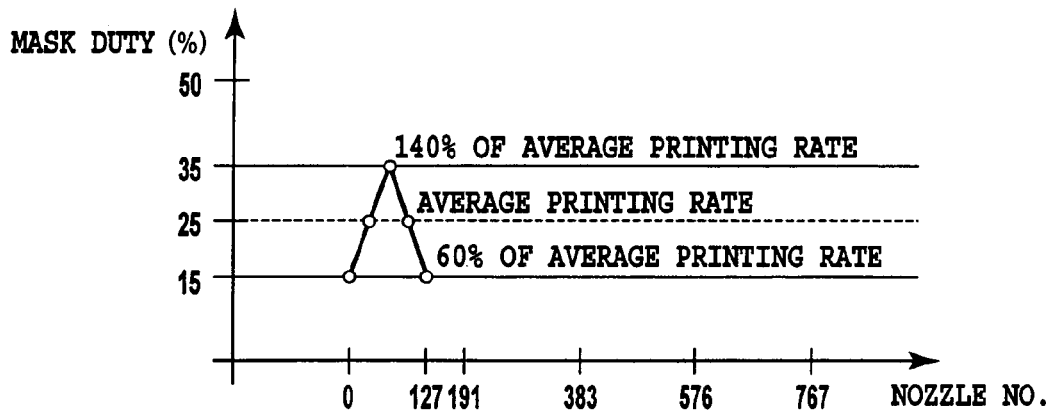

FIG. 25B shows the mask pattern for which the number of printing elements used for printing is reduced to 128 with the printing rates and end printing rate ratio maintained at the same values as those in FIG. 25A. The conventional common mask pattern for the leading and trailing areas has an end printing rate ratio equivalent to that of the mask pattern used for the middle portion.

Figure 25C:
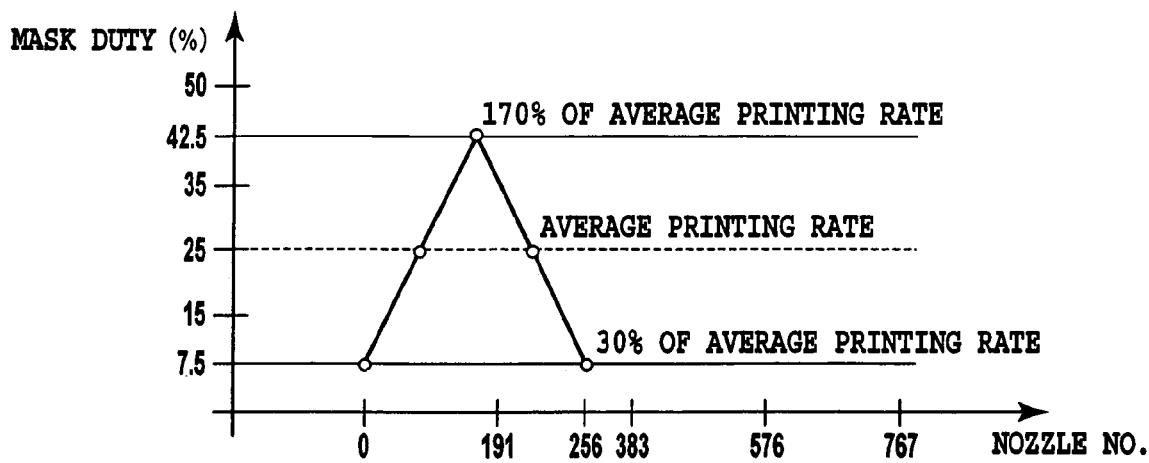

FIG. 25C shows a mask pattern used for the leading and trailing areas in a fast printing mode according to the present embodiment. In this case, 256 printing elements are used which is 2 times as many as in the case of the prior art. Further, the mask pattern has a printing rate equivalent to that shown as curve d in FIG. 7. That is, the printing elements in the middle portion have a printing rate of 42.5%. The printing elements at the terminal have a printing rate of 7.5%. The end printing rate ratio is 0.3.

As described above, the leading and trailing end portions of the print medium are conventionally printed using a mask pattern (shown in FIG. 25B and having an end printing rate ratio of 0.6) having an end printing rate ratio similar to that of a mask pattern for the middle portion of the print medium. Thus, as is apparent from FIG. 11, the allowable error in the conveyance of the print medium is only −3 to +3 μm. Consequently, only 128 printing elements can be used for printing in order to keep the error within the above range. However, the present embodiment uses, for the leading and trailing end portions, the mask pattern (shown in FIG. 25C and having a duty ratio of 0.3) shown by d and which is different from that for the middle portion. This makes it possible to increase the allowable error in the conveyance of the print medium to −4 to +12 μm. Thus, the number of printing elements used for printing can be increased up to 256. The time required to print the leading and trailing end portions can also be reduced to about half.

Photograph images actually output using the above pattern were evaluated. Minor unevenness occurred at the leading and trailing end portions but was not visually perceived. Depending on the types of the images, the presence of unevenness was found but was not enough to be perceived as a defect in the image. In the middle portion, since conveyance accuracy is also sufficient, a uniform high-grade image is realized even using the mask pattern shown by a (mask pattern shown in FIG. 25A).

As described above, the present embodiment, the mask pattern with a lower end printing rate ratio than that used for the middle portion is used for the trailing and leading portions of the print medium. This makes it possible to output good images with black or white stripes or the sense of roughness made unmarked, without the need to reduce the number of printing elements more greatly than required. That is, images having a grade similar to that of conventional ones can be output faster than in the prior art.

In the present embodiment, the same mask pattern shown by d is used for both leading and trailing end portions of the print medium. However, the present invention is not limited to this. For example, different mask patterns may be used depending on the actual conveyance accuracy; for example, the mask d is used for the trailing end portion, at which the conveyance accuracy is expected to decrease, whereas the mask c is used for the leading end portion, at which the conveyance accuracy does not decrease as drastically as that at the trailing end portion. On the contrary, throughput can further be increased provided that the number of printing elements used to print the leading end portion can be set to at least 256 by using the mask d to print the leading end portion.

SECOND EMBODIMENT

A second embodiment of the present invention will be described below. The present embodiment also uses a print apparatus similar to that used in the first embodiment. However, the number of printing elements provided in the print head for each color is 256 instead of 768. Further, 256 printing elements are used to print both the leading, trailing and middle portions, with only the mask pattern changed for each area.

The mask pattern shown by a in FIG. 7 is used for the middle portion of the print medium. The mask pattern shown by d is used for the leading and trailing end portions of the print medium.

With a print apparatus in which the printhead does not have many printing elements as in the case of the present embodiment, the original conveyance error is suppressed. Accordingly, the same number of printing elements as that for the middle portion of the print medium can be used for the leading and trailing end portions of the print medium. However, even in this case, the end printing rate ratio of the mask pattern applied to the leading or trailing end portion of the print medium is set lower than that of the mask pattern for the middle portion. This makes it possible to more positively make insignificant white or black stripes that may occur at the leading or trailing end portion.

As described above, when the leading or trailing end portion of the print medium is subjected to multi-pass printing, the present embodiment appropriately switches the applied mask pattern for the middle portion to that for the leading and trailing end portions. This enables higher-grade images to be output.

THIRD EMBODIMENT

A third embodiment of the present invention will be described below. The present embodiment also uses a print apparatus and a print head similar to those in the first embodiment. However, according to the present embodiment, the mask pattern applied to the middle portion of the print medium is not such a gradation mask as described in the above embodiments. As described in FIG. 4, an image is formed using a mask pattern allowing the printing elements to have an equal printing rate as well as all the 768 printing elements. In contrast, for the leading and trailing end portions of the print medium, an image is formed using 256 printing elements as in the case of the first embodiment and using the mask pattern shown by d.

End-deviations do not always pose a problem in the print apparatus. If end-deviations do not pose any problem, the printing rates of the printing elements are preferably maintained at as equal a value as possible in terms of the lifetime of the print head. However, even with unmarked end-deviations, degraded images at the leading and trailing end portions of the print medium may be considered to be a problem. The present embodiment functions effectively in this situation.

As described above, when the leading or trailing end portions of the print medium is subjected to multi-pass printing, the present embodiment appropriately switches the applied mask pattern and the number of printing elements from those for the middle portion to those for the leading and trailing end portions. This enables higher-grade images to be output.

OTHER EMBODIMENTS

Figure 4:
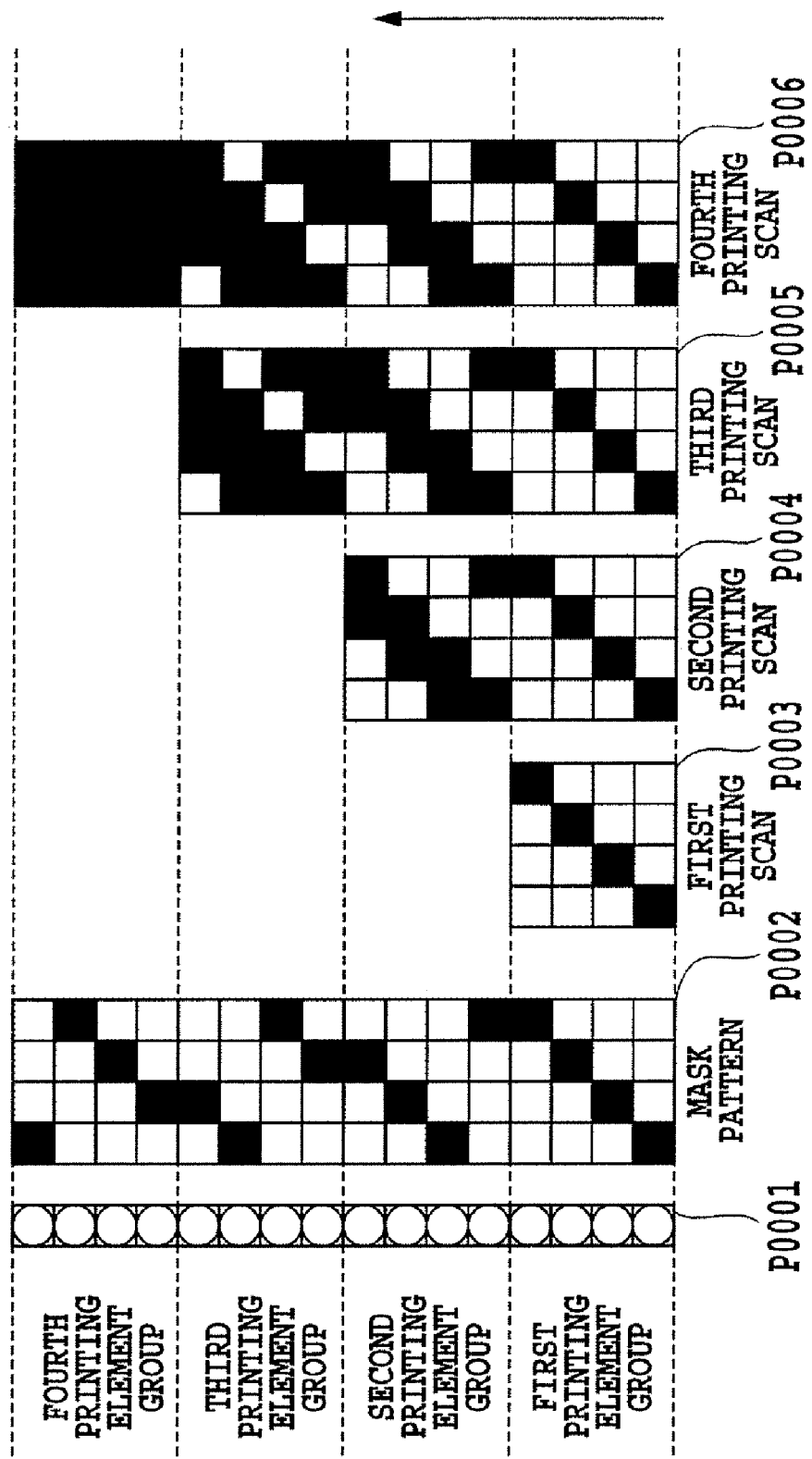
FIG. 4 is diagram schematically showing a print head and print patterns in order to describe a multi-pass printing method.

The form (arrangement form of printing permitted areas) of the mask pattern applicable to the present invention is not limited to the arrangement shown in the above embodiments. The present invention is characterized in the distribution of the printing rates in connection with the positions of the printing elements in the print head. Provided that the printing rate of the printing elements at the end of the print head has a predetermined relative relationship with that of the printing elements at the other areas, the present invention can produce its effects regardless of the arrangement of printing area within the mask pattern. For example, an arrangement may be used in which such a regular pattern as shown in FIG. 4 is periodically repeated. Alternatively, a random arrangement may be used as disclosed in Japanese Patent Application Laid-Open No. 6-330616 (1994). Moreover, the present invention is effective on the application of a mask pattern in which a dot sequence has a predetermined diffusion characteristic as described in Japanese Patent Application Laid-Open No. 2002-144522.

Further, the present invention is not limited to the configuration in which the printing rate varies continuously in connection with the position of the printing element as described in the above embodiments. The present invention can also produce its effects using a configuration in which the printing elements are divided into a plurality of printing element groups so that the printing rate varies step by step within each of the printing element groups obtained by the division.

In the above embodiments, 4-pass printing is described. However, of course, the effects of the present invention are not limited to this. The present invention is also effective on multi-pass printing with more or less passes.

Moreover, in the above embodiments, the ink jet print head ejecting ink in droplet form is described. However, the effects of the present invention are not limited to such a printing method. Provided that a print head having a plurality of printing elements is provided between at least two rollers urging the print medium to be conveyed, such as the conveying roller and sheet discharging roller described in FIGS. 1 to 3 and can form an image at the leading end portion, middle portion, or trailing end portion of the print medium, the present invention can produce its effects regardless of the printing method. Of course, the present invention is also applicable to what is called "margin-less printing" in which an image is printed without creating any margin at the end of the print medium.

As described above, the present invention makes it possible to suppress a decrease in printing grade intrinsic to the leading and trailing end portions of the print medium using the mask pattern. The present invention thus eliminates the need to drastically reduce the number of printing elements used to print the leading or trailing end portion as with the prior art. Therefore, images having a grade similar to that of conventional ones can be output faster than in the prior art.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true spirit of the invention.

This application claims priority from Japanese Patent Application No. 2004-251079 filed Aug. 30, 2004, which is hereby incorporated by reference herein.

What is claimed is:

1. A print apparatus that forms an image by repeating a printing scan that carries out printing on a print medium in accordance with image data while scanning a print head having a plurality of printing elements arranged in a predetermined direction, in a direction different from the predetermined direction, and a conveying operation that conveys the print medium in a direction crossing the scan direction, the apparatus comprising:

a storage section that stores a first mask pattern used to distribute image data corresponding to a middle portion of the print medium, to a plurality of printing scans, and a second mask pattern used to distribute image data corresponding to at least one of the leading and trailing end portions of the print medium, to a plurality of the printing scans;

first printing control means for printing the middle portion of the print medium on the basis of the first mask pattern read from the storage section and image data; and second printing control means for printing the end portion of the print medium on the basis of the second mask pattern read from the storage section and image data, wherein printing rates of the first and second mask patterns are specified so that a printing rate of an end printing element of the printing elements used for the printing by the second printing control means is lower than that of an end printing element of the printing elements used for the printing by the first printing control means and a printing rate of a center printing element of the printing elements used for the printing by the second printing control means is higher than that of a center printing element of the printing elements used for the printing by the first printing control means.

2. The print apparatus according to claim 1, wherein each of the first and second mask patterns are configured so that of the printing elements used for printing, the printing rate of the end printing element is lower than that of a printing element located in the vicinity of the middle portion.

3. The print apparatus according to claim 1, wherein the number of printing elements used for printing executed by the second printing control means is smaller than the number of printing elements used for printing executed by the first printing control means.

4. The print apparatus according to claim 1, further comprising conveying means for conveying the print medium, the conveying means comprising:

first conveying means located upstream of the print head to support and convey the print medium;

second conveying means located downstream of the print head to support and convey the print medium; and determining means for determining that the leading end is printed if the print medium is being supported and conveyed only by the first conveying means, determining that the middle portion is printed if the print medium is being supported and conveyed by the first and second conveying means, and determining that the trailing end portion is printed if the print medium is being supported and conveyed only by the second conveying means.

5. The print apparatus according to claim 4, wherein the second mask pattern used to print the leading end is different from the second mask pattern used to print the trailing end portion.

6. The print apparatus according to claim 1, wherein the printing elements eject ink.

7. A printing method of forming an image by repeating a printing scan that carries out printing on a print medium in accordance with image data while scanning a print head having a plurality of printing elements arranged in a predetermined direction, in a direction different from the predetermined direction, and a conveying operation that conveys the print medium in a direction crossing the scan direction, the method comprising:

a first distributing step of using a first mask pattern to distribute image data corresponding to a middle portion of the print medium, to a plurality of printing scans;

a first printing step of executing the plurality of printing scans to print the same scan area in the middle portion of the print medium, on the basis of the image data distributed in the first distributing step;

a second distributing step of using a second mask pattern to distribute image data corresponding to at least one of the leading end portion or trailing end portion of the print medium, to a plurality of printing scans; and a second printing step of executing the plurality of printing scans to print the same scan area in the end portion of the print medium, on the basis of the image data distributed in the second distributing step, and wherein a printing rate of the second mask pattern corresponding to an end printing element of the printing elements used in the second printing step is lower than that for the first mask pattern corresponding to an end printing element of the printing elements used in the first printing step, and a printing rate of the second mask pattern corresponding to a center printing element of the printing elements used in the second printing step is higher than that for the first mask pattern corresponding to a center printing element of the printing elements used in the first printing step.

* * * * *